United States Patent
Biswas et al.

(10) Patent No.: US 10,515,178 B2
(45) Date of Patent: Dec. 24, 2019

(54) MERGED PILLAR STRUCTURES AND METHOD OF GENERATING LAYOUT DIAGRAM OF SAME

(71) Applicant: TAIWAN SEMICONDUCTOR MANUFACTURING COMPANY, LTD., Hsinchu (TW)

(72) Inventors: Hiranmay Biswas, Kolkata (IN); Chung-Hsing Wang, Baoshan Township (TW); Kuo-Nan Yang, Hsinchu (TW); Yi-Kan Cheng, Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 122 days.

(21) Appl. No.: 15/882,188

(22) Filed: Jan. 29, 2018

(65) Prior Publication Data
US 2019/0065653 A1    Feb. 28, 2019

Related U.S. Application Data

(60) Provisional application No. 62/552,377, filed on Aug. 30, 2017.

(51) Int. Cl.
*G06F 17/50* (2006.01)
*H01L 27/02* (2006.01)
*H01L 27/118* (2006.01)

(52) U.S. Cl.
CPC ...... *G06F 17/5077* (2013.01); *G06F 17/5081* (2013.01); *H01L 27/0207* (2013.01); *H01L 27/11807* (2013.01)

(58) Field of Classification Search
CPC ............. G06F 17/5068; G06F 17/5077; G06F 17/5081; H01L 27/0207
(Continued)

(56) References Cited

U.S. PATENT DOCUMENTS 7,260,442 B2  8/2007  Hwang et al.
9,256,709 B2  2/2016  Yu et al.
(Continued)

FOREIGN PATENT DOCUMENTS

CN  1688933  10/2005
CN  1841388  10/2006
(Continued)

OTHER PUBLICATIONS

Office Action dated Jan. 30, 2019 from corresponding application No. TW 107108924.
(Continued)

*Primary Examiner* — Paul Dinh
(74) *Attorney, Agent, or Firm* — Hauptman Ham, LLP

(57) ABSTRACT

A method (of generating a layout diagram of a conductive line structure includes: determining that a first set of first to fourth short pillar patterns (which represent portions of an M(i) layer of metallization and are located relative to a grid), violates a minimum transverse-routing (TVR) distance of alpha-direction-separation, wherein (1) the grid has orthogonal alpha and beta tracks, and (2) the short pillar patterns have long axes which are substantially co-track aligned with a first one of the alpha tracks and have a first distance (of alpha-direction-separation between immediately adjacent members of the first set) which is less than the TVR distance; and merging pairings of the first & second and third & fourth short pillar patterns into corresponding first and second medium pillar patterns which have a second distance of alpha-direction-separation therebetween; the second value being greater than the TVR distance.

20 Claims, 11 Drawing Sheets

(58) Field of Classification Search
USPC .............................................. 716/54–55, 110
See application file for complete search history.

(56) References Cited

U.S. PATENT DOCUMENTS

| | | |
|---|---|---|
| 2008/0074929 A1 | 3/2008 | Shiga et al. |
| 2012/0290990 A1 | 11/2012 | Toyoda et al. |
| 2012/0297353 A1 | 11/2012 | Igeta et al. |
| 2014/0040838 A1 | 2/2014 | Liu et al. |
| 2015/0278429 A1 | 10/2015 | Chang |
| 2016/0085899 A1* | 3/2016 | Qian .................. G06F 17/5077 257/774 |
| 2016/0162624 A1 | 6/2016 | Sun et al. |
| 2016/0358901 A1 | 12/2016 | Mori et al. |

FOREIGN PATENT DOCUMENTS

| | | |
|---|---|---|
| CN | 101393911 | 3/2009 |
| JP | JP2008-78467 | 4/2008 |
| JP | 2011-49464 | 3/2011 |
| JP | 2014-149458 | 8/2014 |
| TW | 201610732 | 3/2016 |
| TW | 201632998 | 9/2016 |
| TW | 201729133 | 8/2017 |

OTHER PUBLICATIONS

Office Action dated Jul. 22, 2019 from corresponding application No. KR 10-2018-0059096.

\* cited by examiner

MERGED PILLAR STRUCTURES AND METHOD OF GENERATING LAYOUT DIAGRAM OF SAME

BACKGROUND

In many integrated circuits (ICs), power rails are used to distribute power to functional circuit elements formed in a substrate. Power is often delivered to power rails using metal layers between the power rails and power straps at a level above the level of the power rails.

The resistance of an IC structure including such metal layers can affect the efficiency of power delivery, heat generation, and susceptibility to electromigration (EM). Routing of the metal layers can also impact the routing of additional electrical connections to the functional circuit elements.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3C' is a layout diagram 300C' of another conductive line structure of an IC structure, in accordance with at least one embodiment of the present disclosure.

DETAILED DESCRIPTION

Figure 1:
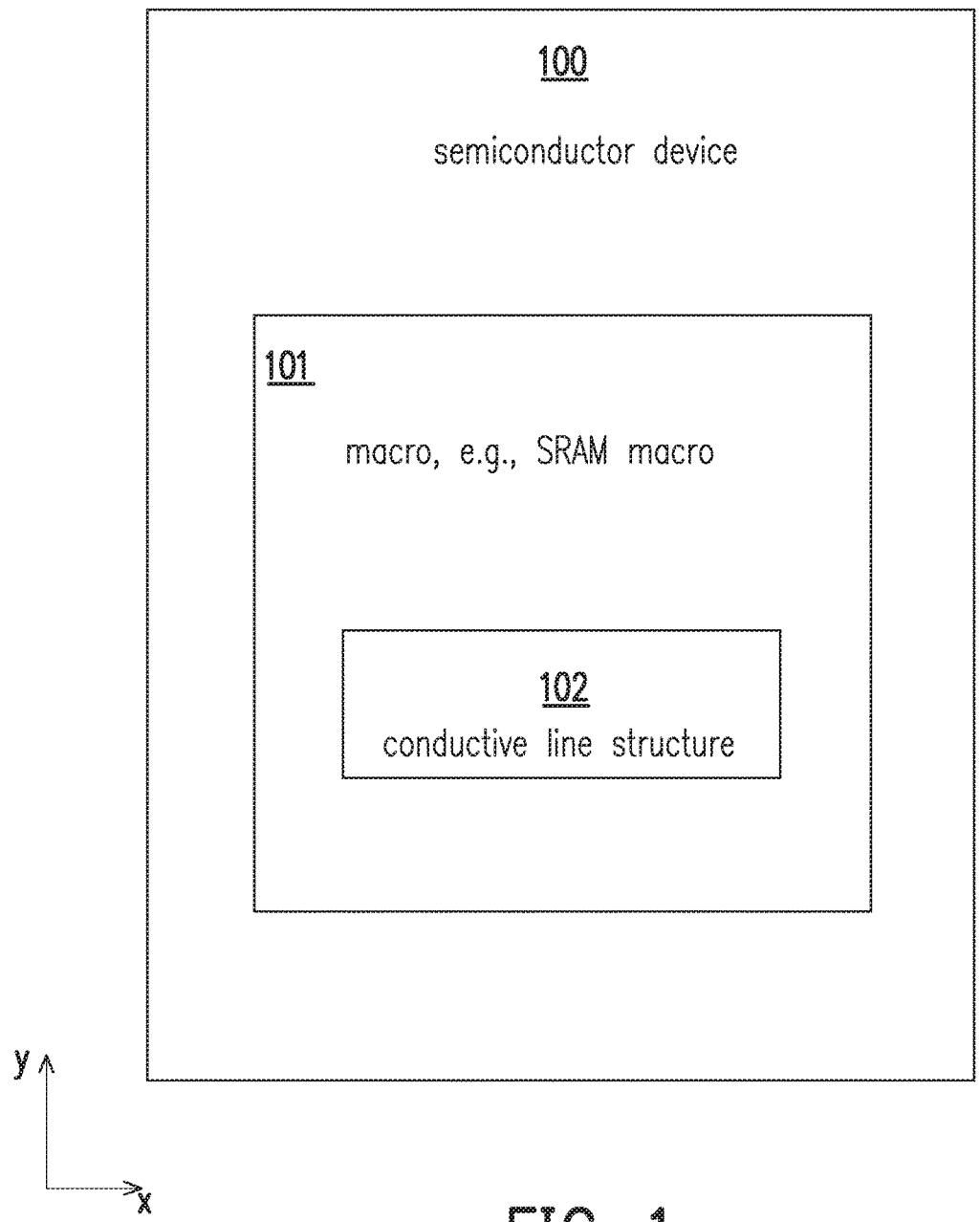
FIG. 1 is a block diagram of an IC structure, in accordance with at least one embodiment of the present disclosure.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. As used herein, the adverb "substantially," as applied to another term, e.g., length, alignment, or the like, is to be understood in the context of variations which result from manufacturing process-tolerances.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

According to at least one embodiment of the present disclosure, pairings of first & second and third & fourth coaxial short pillar patterns of an initial layout diagram are merged into corresponding first and second coaxial medium pillar patterns, resulting in a revised layout diagram. The initial layout diagram is generated according to another approach, is arranged relative to a grid of orthogonal alpha and beta tracks oriented parallel to orthogonal corresponding alpha (e.g., vertical) and beta (e.g., horizontal) directions, and includes (A) a first set of short pillar patterns having long axes substantially coaxial with a first one of the alpha tracks, (B) a second set of short pillars having long axes substantially coaxial with corresponding ones of the beta tracks, and (C) via patterns connected members of the first set of short pillar patterns and corresponding members of the second set of short pillar patterns. Members of the first set of short pillar patterns represent portions of an M(i) layer of metallization, where i is a non-negative integer. Immediately adjacent (in the alpha/vertical direction) members of the first set of short pillar patterns are spaced apart by a first alpha-separation-distance (vertical-separation-distance). beta direction between immediately alpha-direction adjacent (vertically-adjacent) members of the first set of short pillar patterns, an attempt to transversely route a line pattern would violate a design rule because the first alpha-separation-distance is less than a minimum transverse-routing (TVR) alpha-separation-threshold for the M(i) layer. According to at least one embodiment of the present disclosure, merging the pairings of the first & second and third & fourth short pillar patterns into the corresponding first and second medium pillar patterns achieves a second alpha-separation-distance therebetween, where the second alpha-separation distance is greater than the TVR alpha-separation-threshold. Each of the first and second medium pillar patterns has a long axis length which is greater than the long axis length of each of the first to fourth short pillar patterns which were merged to form the medium pillar patterns.

FIG. 1 is a block diagram of an IC structure 100, in accordance with at least one embodiment of the present disclosure.

In FIG. 1, IC structure 100 includes, among other things, a circuit macro/module 101. In some embodiments, circuit macro/module 101 is understood in the context of an analogy to the architectural hierarchy of modular programming in which subroutines/procedures are called by a main program (or by other subroutines) to carry out a given computational function. In this context, IC structure 100 uses circuit macro/module 101 to form one or more given functions. Accordingly, in this context and in terms of architectural hierarchy, IC structure 100 is analogous to the main program and circuit macro/module (hereinafter, macro) 101 is analogous to subroutines/procedures. In some embodiments, macro 101 is a soft macro. In some embodiments, macro 101 is a hard macro. In some embodiments, macro 101 is a soft macro which is described/couched in register-transfer level (RTL) code. In some embodiments, synthesis, placement and routing have yet to have been performed on macro 101 such that the soft macro can be synthesized, placed and routed for a variety of process nodes. In some embodiments, macro 101 is a hard macro which is described/couched in a binary file format (e.g., Graphic Database System II (GDSII) stream format), where the binary file format represents planar geometric shapes, text labels, other information or the like of one or more layout diagrams of macro 101 in hierarchical form. In some embodiments, synthesis, placement and routing have been performed on macro 101 such that the hard macro is specific to a particular process node.

In some embodiments, macro 101 is an SRAM macro. In some embodiments, macro 101 is another macro such as another type of RAM, a ROM, phase lock loops (PLLs), special function circuits, or the like. Macro 101 includes, among other things, a conductive line structure 102. In some embodiments, structure 102 corresponds to a part of or an entirety of an instance of a standard cell structure, where the standard cell structure is included in a library of various standard cell structures.

Figures 2A, 2B:
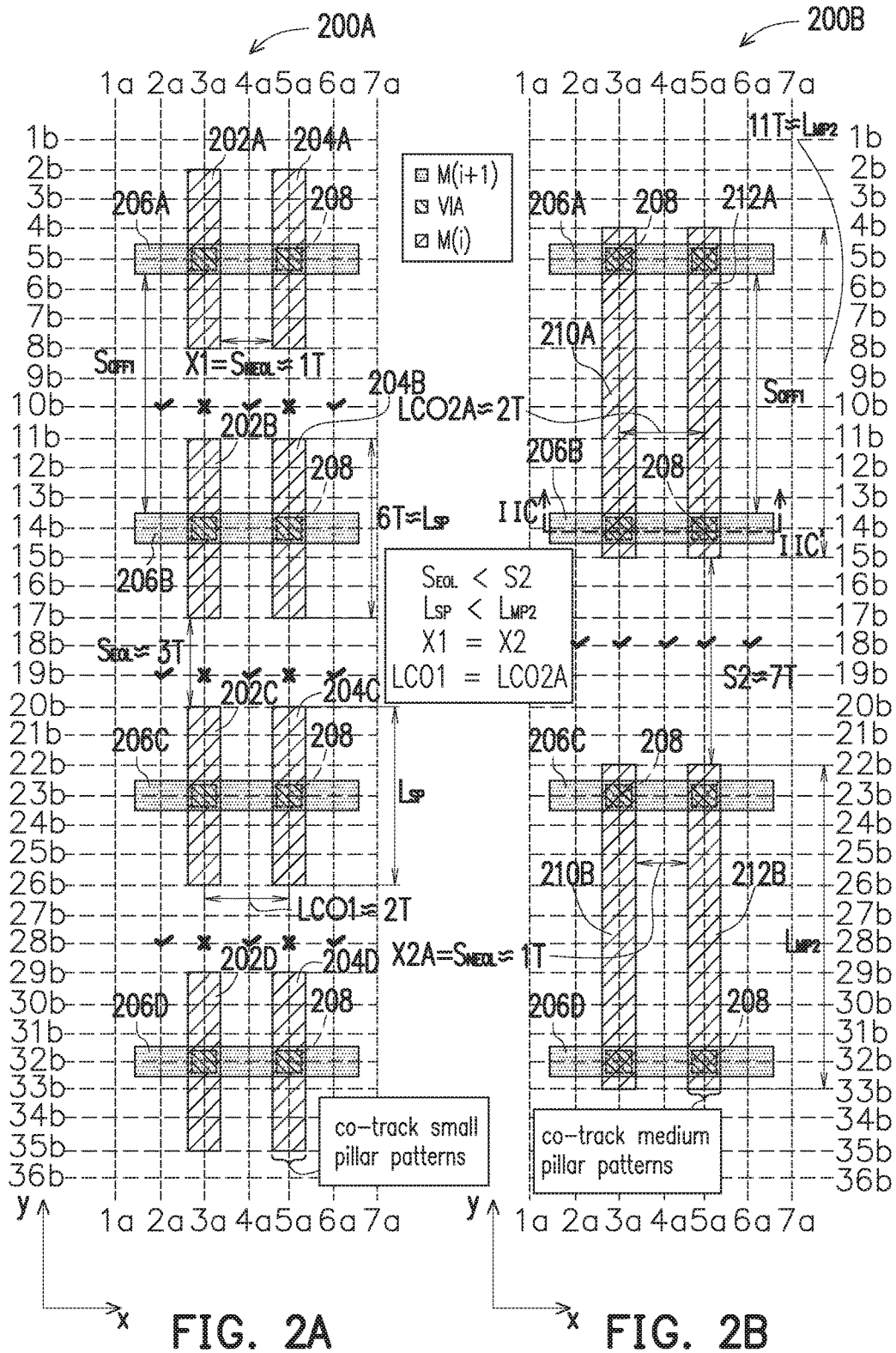
FIG. 2A is a layout diagram of a conductive line structure of an IC structure, relating to at least one embodiment of the present disclosure.
FIG. 2B is another layout diagram of a conductive line structure of an IC structure, in accordance with at least one embodiment of the present disclosure.

FIG. 2A is a layout diagram 200A of a conductive line structure 102 of an IC structure relating to at least one embodiment of the present disclosure.

Layout diagram 200A includes: short pillar patterns 202A-202D and 204A-204D; short pillar patterns 206A-2006D which are transversely oriented relative to short pillar patterns 202A-202D and 204A-204D; and via patterns 208 located between short pillar patterns 202A-202D and 204A-204D and corresponding short pillar patterns 206A-2006D. Short pillar patterns 202A-202D and 204A-204D represent short pillars which are conductive segments/portions of an M(i) layer of metallization, where i is a non-negative integer. For example, i=1 such that M(i)=M(1). Short pillar patterns 206A-206D represent short pillars which are segments/portions of an M(i+1) layer of metallization. Continuing the example, M(i+1) is M(2) in FIG. 2A. Via patterns 208 represent vias which electrically connect the short pillars in M(1) (which short pillar patterns 202A-202D and 204A-204D represent) and the corresponding short pillars in M(2) (which short pillar patterns 206A-206D represent). Via patterns 208 are located (in plan view) at the intersections of short pillar patterns 202A-202D and corresponding short pillar patterns 206A-206D and at the intersections of short pillar patterns 204A-204D and corresponding short pillar patterns 206A-206D.

In terms of arrangement, FIG. 2A is arranged according to an array/grid which includes alpha tracks 1a-7a and beta tracks 1b-36b which are parallel to corresponding orthogonal alpha and beta directions. In FIG. 2A, the alpha direction is vertical and the beta direction is horizontal. For purposes of discussion herein, the term "length" refers to a distance in the first/vertical direction and the term "width" refers to a distance in the second/horizontal direction. In FIG. 2A, the track-spacing between horizontally-adjacent ones of alpha tracks 1a-7a and vertically-adjacent ones of beta tracks 1b-36b is the same and represents a minimum track-spacing for a process-node used to manufacture the conductive line structure corresponding to layout diagram 200A. As such, the minimum track-spacing is process-node dependent/specific.

In FIG. 2A, short pillar patterns 202A-202D and 204A-204D have a width substantially equal to the spacing between immediately beta-direction-adjacent (horizontally-adjacent in FIG. 2A) ones of alpha tracks 1a-7a. In some embodiments, short pillar patterns 202A-202D and 204A-204D have a width substantially equal to an integer, p, multiple of the spacing between immediately beta-direction-adjacent (horizontally-adjacent in FIG. 2A) ones of alpha tracks 1a-7a, where p is a positive integer and p≥2. In some embodiments, short pillar patterns 202A-202D and 204A-204D have a width other than a width which is substantially equal to an integer multiple of the spacing between immediately beta-direction-adjacent (horizontally-adjacent in FIG. 2A) ones of alpha tracks 1a-7a.

In FIG. 2A, short pillar patterns 202A-202D and 204A-204D do not overlap each other. Short pillar patterns 202A-202D have long axes of symmetry which are substantially co-track aligned with alpha track 3a. Short pillar patterns 204A-204D have long axes which are substantially co-track aligned with alpha track 5a. Short pillar patterns 202A and 204A have short axes of symmetry which are substantially co-track aligned with beta track 5b. Short pillar patterns 202B and 204B have short axes of symmetry which are substantially co-track aligned with beta track 14b. Short pillar patterns 202C and 204C have short axes of symmetry which are substantially co-track aligned with beta track 23b. Short pillar patterns 202D and 204D have short axes of symmetry which are substantially co-track aligned with beta track 32b.

Short pillar patterns 202A-202D and 204A-204D are offset from immediately neighboring ones of each other in the vertical direction by a distance of alpha-direction-separation (vertical-separation in FIG. 2A) distance $S_{EOL}$, where $S_{EOL}$ represents a minimum end-of-line spacing of a process-node used for manufacturing the conductive line structure corresponding to layout diagram 200A. As such, $S_{EOL}$ is process-node dependent/specific. In FIG. 2A, $S_{EOL}$ is substantially three tracks (3T).

Long axes of short pillar patterns 202A-202D and 204A-204D are offset from immediately neighboring ones of each other in the horizontal direction by a long-centerline-offset (LCO) distance, LCO1. In FIG. 2A, LCO1 is substantially equal to two tracks (2T) such that LCO1≈2T, which results in gaps between short pillar patterns 202A-202D and corresponding short pillar patterns 204A-204D that have a distance X1. In FIG. 2A, X1 is substantially equal to one track (1T). In FIG. 2A, a distance of one track (1T) represents a distance $S_{NEOL}$, where $S_{NEOL}$ is a minimum non-end-of-line spacing of a process-node used for manufacturing the conductive line structure corresponding to layout diagram 200A, such that $X1=S_{NEOL}\approx 1T$. As such, $S_{NEOL}$ is process-node dependent/specific. In some embodiments, LOC1 is greater than two tracks (2T) and thus X1 is greater than $S_{NEOL}$. In some embodiments, X1 is a multiple of $S_{NEOL}$, such that $X1=p*S_{NEOL}$, where p is a positive even integer, and p≥2.

Each of short pillar patterns 202A-202D and 204A-204D has a length, $L_{SP}$, substantially equal to the minimum length, $L_{MIN}$, of line segment achievable according to the process-node used for manufacturing the conductive line structure corresponding to layout diagram 200A. In FIG. 2A, $L_{MIN}$ is substantially four tracks (4T). Similar to $S_{EOL}$, $L_{SP}$ is process-node dependent/specific. In FIG. 2A, $L_{SP}$ is substantially twice $S_{EOL}$ such that $L_{SP} 2*S_{EOL}$. Accordingly, in FIG. 2A, $L_{SP}$ is substantially six tracks (6T).

In FIG. 2A, short pillar patterns 206A-206D do not overlap each other. Short pillar patterns 206A-206D have long axes of symmetry which are substantially co-track aligned with corresponding beta tracks 5b, 14b, 23b and 32b. Short pillar patterns 206A-206D have short axes of symmetry which are substantially co-track aligned with alpha track 4a.

Short pillar patterns 206A-206D are substantially aligned with the short axes of symmetry of corresponding short pillar patterns 202A-202D and 204A-204D such that short pillar patterns 206A-206D are offset from immediately neighboring ones of each other in the vertical direction by a vertical-separation distance $S_{OFF1}$. In FIG. 2A, $S_{OFF1}$ is substantially eight tracks (8T). Each of short pillar patterns 206A-206D has a length, $L_{SP}$.

In FIG. 2A, the vertical-separation distance $S_{EOL}$ is sufficient for vertically-adjacent pairings of short pillar patterns 202A-202D and 204A-204D, which have no line pattern (representing a conductive segment/portion in layer M(1)) routed transversely therebetween. Nevertheless, the vertical-separation distance $S_{EOL}$ is not sufficient for routing a line pattern (representing a conductive segment/portion in layer M(1)) transversely between vertically-adjacent pairings of short pillar patterns 202A-202D and 204A-204D. The vertical-separation distance $S_{EOL}$ violates a design rule which imposes a minimum transverse-routing (TVR) separation threshold of vertical-separation for the M(i) layer, which in FIG. 2A is M(i)=M(1). In FIG. 2A, a letter "X" is shown in regions along alpha tracks for which there is a TVR vertical-separation (vertical-gap) rule violation. Conversely, a check symbol "√" is shown in regions along alpha tracks for which there is TVR vertical-separation (vertical-gap) rule compliance.

According to at least one embodiment of the present disclosure, layout diagram 200A is revised into a layout diagram 200B of FIG. 2B (discussed below, see also the discussion below of the flowchart of FIG. 4) as a way to achieve TVR vertical-separation (vertical-gap) rule compliance (relative to a transversely routed line pattern representing a conductive segment/portion in layer M(i), which is layer M(1) in FIG. 2A), and thereby achieve sufficient TVR vertical-separation for transversely routing a line pattern.

FIG. 2B is a layout diagram 200B of a conductive line structure 102 of an IC structure, in accordance with at least one embodiment of the present disclosure.

In some embodiments, the conductive line structure is conductive line structure 102 of FIG. 1. In some embodiments, the IC structure is IC structure 100 of FIG. 1. In some embodiments, the conductive line structure is conductive line structure 200C of FIG. 2C (discussed below).

Layout diagram 200B of FIG. 2B is similar to layout diagram 200A of FIG. 2A. For the sake of brevity, similarities between layout diagram 200B and layout diagram 200A will not be discussed. Rather, the discussion will focus on differences between layout diagram 200B and layout diagram 200A.

Layout diagram 200B includes: medium pillar patterns 210A-210B and 212A-212B; short pillar patterns 206A-2006D which are transversely oriented relative to medium pillar patterns 210A-210B and 212A-212B; and via patterns 208 located between medium pillar patterns 210A-210B and 212A-212B and corresponding short pillar patterns 206A-2006D. Medium pillar patterns 210A-210B and 212A-212B represent medium pillars which are conductive segments/portions of an M(i) layer of metallization, where i is a non-negative integer. In FIG. 2A, i=1 such that M(i)=M(1). In some embodiments, i is a non-negative integer other than one.

In terms of arrangement, similar to FIG. 2A, FIG. 2B is arranged according to an array/grid for which the alpha direction is vertical and the beta direction is horizontal. In some embodiments, the first and beta directions are directions other than the corresponding vertical and horizontal directions. Similar to FIG. 2A, the track-spacing in FIG. 2B between horizontally-adjacent ones of alpha tracks 1a-7a and vertically-adjacent ones of beta tracks 1b-32b is the same and represents the minimum track-spacing for a process-node used to manufacture the conductive line structure corresponding to layout diagram 200B. As such, the minimum track-spacing is process-node dependent/specific. In some embodiments, the track-spacing between horizontally-adjacent ones of alpha tracks 1a-7a is a first track-spacing and the track-spacing between vertically-adjacent ones of beta tracks 1b-32b is a second track-spacing, and the first track-spacing is different than the second track-spacing.

In FIG. 2B, medium pillar patterns 210A-210B and 212A-212B do not overlap each other. Medium pillar patterns 210A-210B have long axes of symmetry which are substantially co-track aligned with alpha track 3a. Medium pillar patterns 212A-212B have long axes which are substantially co-track aligned with alpha track 5a. Medium pillar patterns 210A and 212A have short axes of symmetry which are substantially aligned to a horizontal line located halfway between beta tracks 8b-9b. Medium pillar patterns 210B and 212B have short axes of symmetry which are substantially aligned to a horizontal line located halfway between beta tracks 26b-27b.

Medium pillar patterns 210A-210B and 212A-212B are offset from immediately neighboring ones of each other in the vertical direction by a distance of alpha-direction-separation (vertical-separation in FIG. 2B) distance S2, where S2 is greater than the distance $S_{EOL}$. Again, $S_{EOL}$ represents the minimum end-of-line spacing of a process-node used for manufacturing the conductive line structure corresponding to layout diagram 200B, which makes $S_{EOL}$ process-node dependent/specific.

In some embodiments, S2 is a function of $S_{EOL}$ such that $S2=f(S_{EOL})$. The distance S2 is selected so as to achieve TVR vertical-separation (vertical-gap) rule compliance and thereby achieve sufficient TVR vertical-separation for transversely routing a line pattern. In some embodiments, the distance S2 is selected according to the TVR separation threshold of vertical-separation for the M(i) layer, which in FIG. 2B is M(i)=M(1). In some embodiments, the distance S2 is selected according to the TVR separation threshold of vertical-separation for an M(i+j) layer of metallization, where j is a positive integer and j>1. In FIG. 2B, S2 is slightly greater than substantially twice $S_{EOL}$ such that $S2≈2*S_{EOL}$ AND $S2≥(≈2*S_{EOL})$. Accordingly, in FIG. 2B, S2 is substantially seven tracks (7T). In some embodiments, $S2≥(L_{MIN}+2*S_{EOL})$, where (again,) $L_{MIN}$ is the minimum length of line segment achievable according to the process-node used for manufacturing the conductive line structure corresponding to layout diagram 200B. Similar to $S_{EOL}$, $L_{MIN}$ is process-node dependent/specific. In some embodiments, $≈(4/3)*S_{EOL}≤S2≈≈2*S_{EOL}$. In some embodiments, S2 is a function of $S_{EOL}$ other than $S2≈2*S_{EOL}$ or $S2≥(L_{MIN}+2*S_{EOL})$ or $≈(4/3)*S_{EOL}≤S2≈≈2*S_{EOL}$. In some embodiments, S2 is a number of tracks other than substantially seven.

Long axes of medium pillar patterns 210A-210B and 212A-212B are offset from immediately neighboring ones of each other in the horizontal direction by a LCO distance, LCO2A. In FIG. 2B, LCO2A is substantially equal to two tracks (2T) such that LCO2A≈2T, which results in gaps between medium pillar patterns 210A-210B and corresponding medium pillar patterns 212A-212B that have a distance X2A. In FIG. 2B, $X2A=S_{NEOL}≈1T$ In some embodiments, LOC2A is greater than two tracks (2T) and thus X2A is greater than $S_{NEOL}$. In some embodiments, X2A is a multiple of $S_{NEOL}$, such that $X2A=p*S_{NEOL}$, where p is a positive even integer, and p≥2.

In FIG. 2B, medium pillar patterns 210A-210B and 212A-212B have a width substantially equal to the spacing between immediately beta-direction-adjacent (horizontally-adjacent in FIG. 2A) ones of alpha tracks 1a-7a. In some embodiments, medium pillar patterns 210A-210B and 212A-212B have a width substantially equal to an integer, p, multiple of the spacing between immediately beta-direction-adjacent (horizontally-adjacent in FIG. 2B) ones of alpha tracks 1a-7a, where p is a positive integer and p≥2. In some embodiments, medium pillar patterns 210A-210B and 212A-212B have a width other than a width which is substantially equal to an integer multiple of the spacing between immediately beta-direction-adjacent (horizontally-adjacent in FIG. 2A) ones of alpha tracks 1a-7a.

In FIG. 2B, short pillar patterns 206A-206D have: long axes of symmetry which remain substantially co-track aligned with corresponding beta tracks 5b, 14b, 23b and 32b; short axes of symmetry which remain substantially co-track aligned with alpha track 4a; have a width which remains the width $L_{SP}$; and have an offset from immediately neighboring ones of each other in the vertical direction which remains the distance $S_{OFF1}$. In FIG. 2B, $S_{OFF1}$ is substantially eight tracks (8T). In some embodiments, $S_{OFF1}$ is a number of tracks other than substantially eight. In some embodiments, $L_{SP}$ is a function of $S_{EOL}$ such that $L_{SP}=f(S_{EOL})$. In FIG. 2B, $L_{SP}$ is substantially twice $S_{EOL}$ such that $L_{SP}≈2*S_{EOL}$. Accordingly, in FIG. 2B, $L_{SP}$ is substantially six tracks (6T). In some embodiments, $L_{SP}$ is a function of $S_{EOL}$ other than $L_{SP}≈2*S_{EOL}$. In some embodiments, $L_{SP}$ is a number of tracks other than substantially six.

In FIG. 2B, short pillar patterns 206A-206D are located near corresponding ends of medium pillar patterns 210A-210B and 212A-212B so as to produce small overhangs of medium pillar patterns 210A-210B and 212A-212B beyond corresponding short pillar patterns 206A-206D. Here, in the context of a region representing an overlap of a first structure with a second structure, the term "overhang" describes a distance that the first structure extends beyond the region of overlap with the second structure. In some embodiments, the overhang of medium pillar patterns 210A-210B and 212A-212B relative to short pillar patterns 206A-206D is a length $L_{OHEOL}$, which represents (relative to a process-node used for manufacturing the conductive line structure corresponding to layout diagram 200B) the minimum amount of overhang needed to ensure substantially total overlap of a via pattern 208 with an end of a corresponding one of medium pillar patterns 210A-210B and 212A-212B. In some embodiments, length $L_{OHEOL}$ is minimized in order to increase space between the medium pillar patterns, which facilitates placement/routing of signal lines. In some embodiments, length $L_{OHEOL}$ is ¾*T. In some embodiments in which length $L_{OHEOL}$ is ¾*T, a corresponding via has a sustantially square shape with sides having a length ½*T. As such, $L_{OHEOL}$ is process-node dependent/specific.

Each of medium pillar patterns 210A-210B and 212A-212B has a length, $L_{MP2}$, where $L_{SP}<L_{MP2}$. In some embodiments, $L_{MP2}$ is a function of $L_{SP}$ such that $L_{MP2}=f(L_{SP})$, where (again) $L_{SP}$ is substantially equal to $L_{MIN}$, and (again) $L_{MIN}$ is the minimum length of line segment achievable according to the process-node used for manufacturing the conductive line structure corresponding to layout diagram 200B such that $L_{MIN}$ is process-node dependent/specific, and thus $L_{MP2}$ is process-node dependent. In FIG. 2B, $L_{MP2}$ is slightly less than substantially twice $L_{SP}$ such that $L_{MP2}≈2*L_{SP}$ AND $L_{MP2}<(≈2*L_{SP})$. Accordingly, in FIG. 2B, $L_{MP2}$ is substantially eleven tracks (11T). In FIG. 2B, $L_{MP2}$ is substantially twice $S_{EOL}$ such that $L_{SP}≈2*S_{EOL}$. Accordingly, in FIG. 2A, $L_{SP}$ is substantially six tracks (6T). In some embodiments, $L_{MP2}$ is a function of $L_{SP}$ other than $L_{MP2}≈2*L_{SP}$ AND $L_{MP2}<(≈2*L_{SP})$. In some embodiments, $L_{MP2}$ is a number of tracks other than substantially eleven. In some embodiments, $L_{MP2}<L_{LP}$, where $L_{LP}$, is a length of a long pillar, where $L_{LP}$ is substantially equal to, albeit without being greater than, the Blech length, $L_{Blech}$, such that $L_{LP}≈L_{Blech}$ AND $L_{LP}<L_{Blech}$. It is noted that $L_{Blech}$ represents a length of conductor below which substantially no electromigration occurs.

An IC structure fabricated at least in part according layout diagram 200B of FIG. 2B (relative to a corresponding IC structure not fabricated according to layout diagram 200B), has one or more of the following advantages: merged-pillars and therefore a reduced consumption of routing-resources and/or a greater wiring density; or a reduced total wiring length (TWL) and therefore reduced Joule heating According to at least one embodiment of the present disclosure, layout diagram 200B is a result of having revised layout diagram 200A by having merged pairings of short pillar patterns 202A-202D and 204A-204D of FIG. 2A into corresponding medium pillar patterns 210A-210B and 212A-212B of FIG. 2B. In particular, short pillar patterns 202A-202B of FIG. 2A are merged to form medium pillar pattern 210A of FIG. 2B. Short pillar patterns 202C-202D of FIG. 2A are merged to form medium pillar pattern 210B of FIG. 2B. Short pillar patterns 204A-204B of FIG. 2A are merged to form medium pillar pattern 212A of FIG. 2B. Short pillar patterns 204C-204D of FIG. 2A are merged to form medium pillar pattern 212B of FIG. 2B. In some embodiments, as part of revising layout diagram 200A into layout diagram 200B, via patterns 208 are relocated accordingly. As a result, in FIG. 2B, the vertical-separation distance S2 is sufficient for routing a line pattern transversely between vertically-adjacent pairings of medium pillar patterns 210A-210B and 212A-212B. The vertical-separation distance S2 complies with a design rule which imposes a minimum TVR separation threshold of vertical-separation for an M(i) layer of metallization, which in FIG. 2B is M(i)=M(1). In FIG. 2B, no letter "X" is shown in regions along alpha tracks (between vertically-adjacent medium pillar patterns 210A-210B and 212A-212B) because there is no TVR vertical-separation (vertical-gap) rule violation. Rather, in FIG. 2B, only the check symbol "√" is shown in regions along alpha tracks, which reflects TVR vertical-separation (vertical-gap) rule compliance for all alpha tracks in FIG. 2B.

Figure 2C:
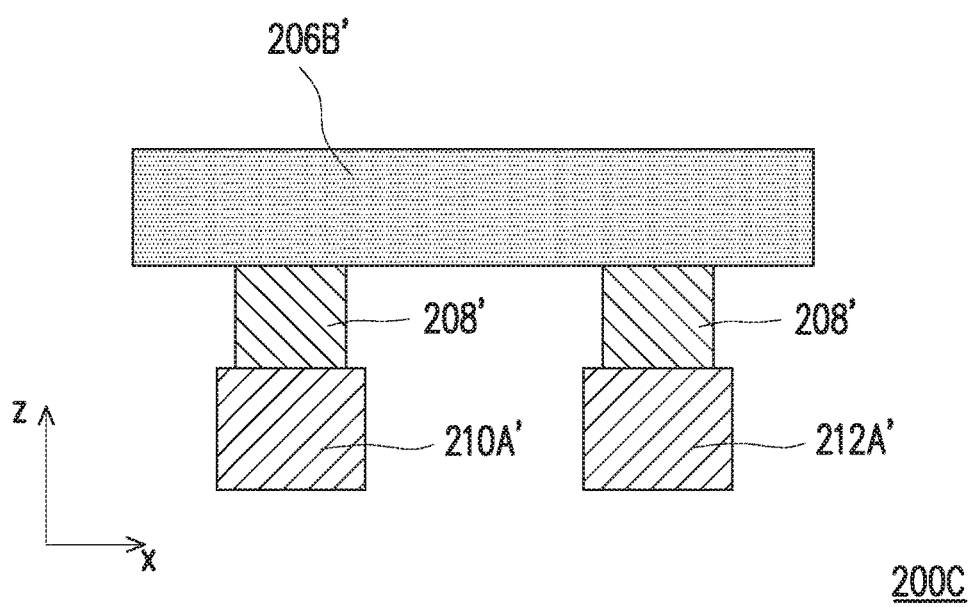
FIG. 2C is a cross-sectional diagram of the conductive line structure of an IC structure relating to the layout of FIG. 2B, in accordance with at least one embodiment of the present disclosure.

FIG. 2C is a cross-sectional diagram of a conductive line structure 200C of an IC structure, in accordance with at least one embodiment of the present disclosure.

In some embodiments, the IC structure is IC structure 100 of FIG. 1. In some embodiments, conductive line structure 200C is fabricated at least in part according to layout diagram 200B of FIG. 2B.

In FIG. 2C, conductive line structure 200C includes: medium pillars 201A' and 212A', which are conductive structures and which relate to corresponding medium pillar patterns 210A and 212B of FIG. 2B; vias 208', which are conductive structures and which relate to via patterns 208 of FIG. 2B; and a short pillar 206B', which is a conductive structure and which relates to short pillar pattern 206B of FIG. 2B.

Figure 3A:
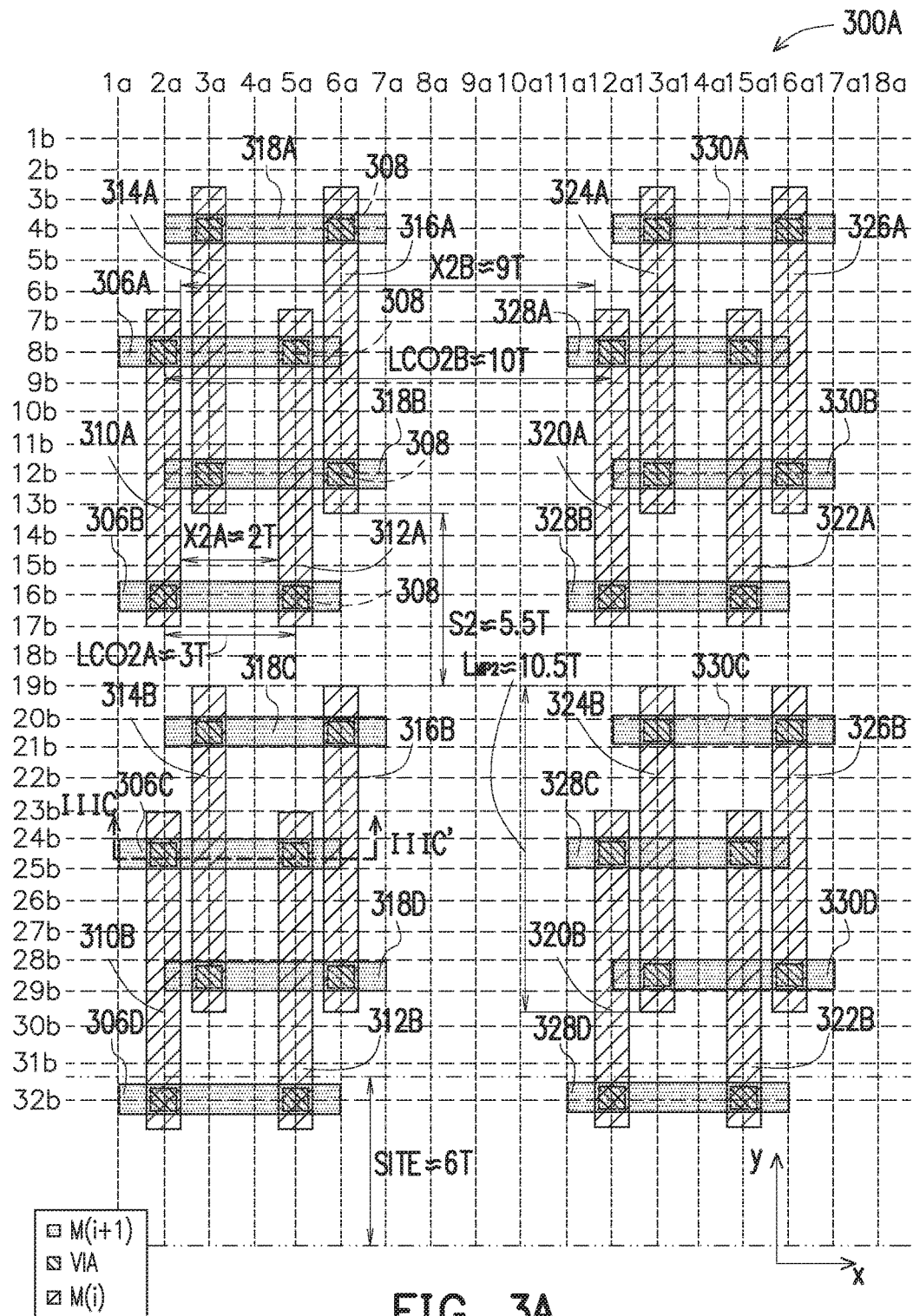
FIG. 3A is a layout diagram of yet another conductive line structure of an IC structure, in accordance with at least one embodiment of the present disclosure.

FIG. 3A is a layout diagram 300A of a conductive line structure of an IC structure, in accordance with at least one embodiment of the present disclosure. In some embodiments, the conductive line structure is conductive line structure 102 of FIG. 1. In some embodiments, the IC structure is IC structure 100 of FIG. 1.

Layout diagram 300A of FIG. 3A is similar to layout diagram 200B of FIG. 2B. Accordingly, relative to FIG. 2B, the numbering of corresponding objects in FIG. 3A is increased by 100. For the sake of brevity, similarities between layout diagram 200B and layout diagram 300A will not be discussed. Rather, the discussion will focus on differences between layout diagram 300A and layout diagram 200B.

Layout diagram 300A not only includes medium pillar patterns 310A-310B and 312A-312B, short pillar patterns 306A-306D and via patterns 308 of layout diagram 200B of FIG. 2B, layout diagram 300A further includes (among other things): medium pillar patterns 314A-314B and 316A-316B; short pillar patterns 318A-318D which are transversely oriented relative to medium pillar patterns 314A-314B and 316A-316B; via patterns 308 located between medium pillar patterns 314A-314B and 316A-316B and corresponding short pillar patterns 318A-318D; medium pillar patterns 320A-320B, 322A-322B, 324A-324B and 326A-326B, and the like; short pillar patterns 328A-328D and 330A-330D, and the like, and yet additional via patterns 308. Medium pillar patterns 314A-314B and 316A-316B represent medium pillars which are conductive segments/portions of the M(i) layer, where i is a non-negative integer. In FIG. 3A, i=1 such that M(i)=M(1). In some embodiments, i is a non-negative integer other than one. Short pillar patterns 318A-318D represent short pillars which are segments/portions of an M(i+1) layer of metallization. Continuing the example, M(i+1) is M(2) in FIG. 3A. Via patterns 308 represent vias which electrically connect the short pillars in M(1) (which short pillar patterns 310A-310B, 312A-312B, 314A-314B and 316A-316B represent) and the corresponding short pillars in M(2) (which short pillar patterns 306A-306D and 318A-318D represent). medium pillar patterns 320A-320B, 322A-322B, 324A-324B and 326A-326B; and the like.

In some embodiments, layout diagram 300A is part of a power grid. In some embodiments, medium pillar patterns 310A-310B, 312A-312B, 320A-320B and 322A-322B represent medium pillars which are provided with a first reference voltage. In some embodiments, the first reference voltage is VDD. In some embodiments, medium pillar patterns 314A-314B, 316A-316B, 324A-324B and 326A-326B represent medium pillars which are provided with a second reference voltage. In some embodiments, the first reference voltage is VSS.

Medium pillar patterns 310A-310B & corresponding counterpart medium pillar patterns 312A-312B, and medium pillar patterns 314A-314B & corresponding counterpart medium pillar patterns 316A-316B, are offset from immediately neighboring ones of each other in the horizontal direction by a beta-direction-separation (horizontal-separation in FIG. 3A) distance X2A, where X2A is greater than or equal to the distance X1 of FIG. 2A. In FIG. 3A, X2A is substantially three tracks (3T). In some embodiments, X2A is a number of tracks greater than substantially three.

Medium pillar patterns 310A-310B & corresponding counterpart medium pillar patterns 312A-312B are interspersed with medium pillar patterns 314A-314B & corresponding counterpart medium pillar patterns 316A-316B. As such, short pillar patterns medium pillar patterns 310A-310B, which are connected by via patterns 308 to corresponding counterpart medium pillar patterns 312A-312B, are not provided with via patterns 308 which otherwise would connect to medium pillar patterns 314A-314B or 316A-316B. Similarly, short pillar patterns medium pillar patterns 314A-314B, which are connected by via patterns 308 to corresponding counterpart medium pillar patterns 316A-316B, are not provided with via patterns 308 which otherwise would connect to medium pillar patterns 310A-310B or 312A-312B.

In FIG. 3A, long axes of medium pillar patterns 310A-310B & corresponding medium pillar patterns 312A-312B, medium pillar patterns 314A-314B & corresponding medium pillar patterns 316A-316B, medium pillar patterns 320A-320B and corresponding medium pillar patterns 322A-322B, and medium pillar patterns 324A-324B and corresponding medium pillar patterns 326A-326B, are offset from immediately neighboring ones of each other in the horizontal direction by LCO distance LCO2A. In FIG. 2B, LCO2A is substantially equal to three tracks (3T) such that LCO2A≈3T, which results in corresponding gaps which have a distance X3A. In particular, medium pillar patterns 310A-310B & corresponding medium pillar patterns 312A-312B, and medium pillar patterns 312A-312B, and medium pillar patterns 320A-320B and corresponding medium pillar patterns 322A-322B, have gaps of size X2A between immediately neighboring ones of each other in the horizontal direction. In FIG. 2B, X2A=$S_{NEOL}$≈1T In some embodiments, LOC2A is greater than three tracks (3T). In some embodiments, X2A is a multiple of $S_{NEOL}$, such that X2A=p*$S_{NEOL}$, where p is a positive even integer, and p≥4.

Also in FIG. 3A, medium pillar patterns 310A-310B are offset from corresponding counterpart medium pillar patterns 320A-320B, medium pillar patterns 312A-312B are offset from corresponding counterpart medium pillar patterns 322A-322B, medium pillar patterns 314A-314B are offset from corresponding counterpart medium pillar patterns 324A-324B, and medium pillar patterns 316A-316B are offset from corresponding counterpart medium pillar patterns 326A-326B, are offset from immediately neighboring ones of each other in the horizontal direction by LCO distance LCO2B. In FIG. 3A, X2B is substantially ten tracks (10T) such that LCO2B≈10T, which results in corresponding gaps which have a distance X3B. In particular, medium pillar patterns 310A-310B & corresponding medium pillar patterns 320A-320B, medium pillar patterns 312A-312B & corresponding medium pillar patterns 322A-322B, medium pillar patterns 314A-314B & corresponding medium pillar patterns 324A-324B, and medium pillar patterns 316A-316B and corresponding medium pillar patterns 326A-326B, have gaps of size X2A between immediately neighboring ones of each other in the horizontal direction. In FIG. 2B, X2B is substantially 9 tracks (9T) such that X2B≈9T. In some embodiments, LOC2B is greater than ten tracks (10). In some embodiments, X2B is a multiple of $S_{NEOL}$, such that X2B=p*$S_{NEOL}$, where p is a positive even integer, and p≥4. In some embodiments, X2B is a number of tracks other than substantially ten.

In FIG. 3A, the vertical-separation distance S2 is sufficient for vertically-adjacent pairings of medium pillar patterns 310A-310B, 312A-312B, 314A-314B, 316A-316B, 320A-320B, 322A-322B, 322A-322B, 324A-324B, and the like, in order to have a line pattern (representing a conductive segment/portion in layer M(i), which is M(i)=M(1) in FIG. 3A) routed transversely therebetween. Nevertheless, the distance of vertical-separation having the distance S2 is not sufficient for routing a line pattern (representing a conductive segment/portion in layer M(i+j), where j is a positive even integer and j≥2) routed transversely therebetween.

In FIG. 3A, S2 is shown as substantially 5.5 tracks (5.5T) and $L_{MP2}$ is shown as substantially 10.5 tracks (10.5T). In some embodiments, S2 is a number of tracks other than substantially 5.5. In some embodiments, $L_{MP2}$ is a number of tracks other than substantially 10.5. In some embodiments, $L_{MP2}<L_{LP}$, where (again) $L_{LP}$ is a length of a long pillar, and where (again) $L_{LP}$ is substantially equal to, albeit without being greater than, the Blech length, $L_{Blech}$, such that $L_{LP}≈L_{Blech}$ AND $L_{LP}<L_{Blech}$. Again, $L_{Blech}$ represents a length of conductor below which substantially no electromigration occurs.

In FIG. 3A, medium pillar patterns 310A-310B, 312A-312B, 314A-314B, 320A-320B, 322A-322B, 324A-324B and 326A-326B have a width substantially equal to the spacing between immediately beta-direction-adjacent (horizontally-adjacent in FIG. 2A) ones of alpha tracks 1a-7a. In some embodiments, medium pillar patterns 310A-310B, 312A-312B, 314A-314B, 320A-320B, 322A-322B, 324A-324B and 326A-326B have a width substantially equal to an integer, p, multiple of the spacing between immediately beta-direction-adjacent (horizontally-adjacent in FIG. 3A) ones of alpha tracks 1a-7a, where p is a positive integer and p≥2. In some embodiments, medium pillar patterns 310A-310B, 312A-312B, 314A-314B, 320A-320B, 322A-322B, 324A-324B and 326A-326B have a width other than a width which is substantially equal to an integer multiple of the spacing between immediately beta-direction-adjacent (horizontally-adjacent in FIG. 3A) ones of alpha tracks 1a-7a.

Figure 3B:
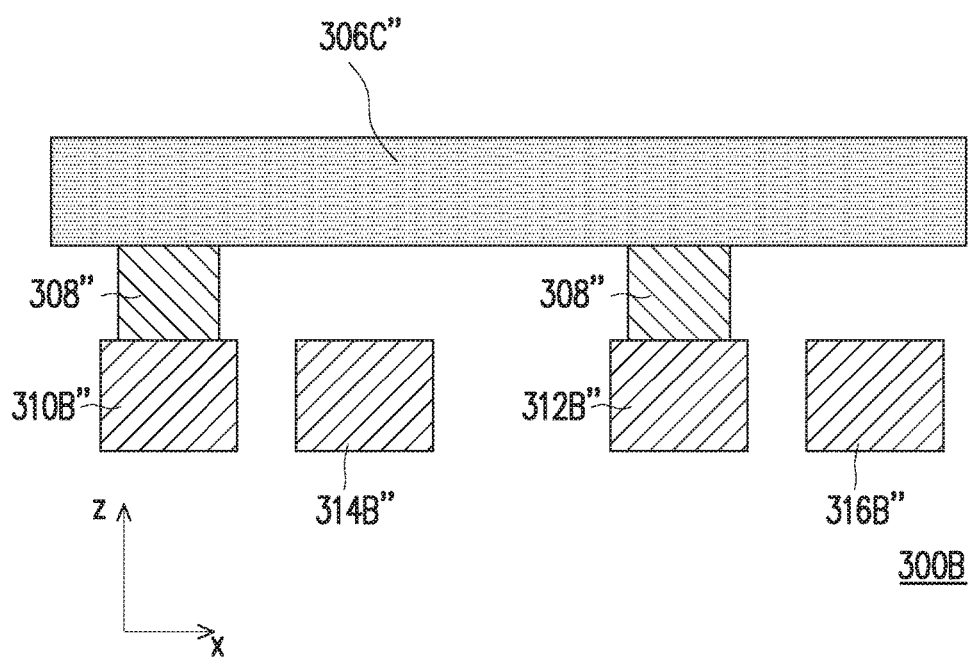
FIG. 3B is a cross-sectional diagram of the conductive line structure of an IC structure relating to the layout of FIG. 3A, in accordance with at least one embodiment of the present disclosure.
Figure 3C:
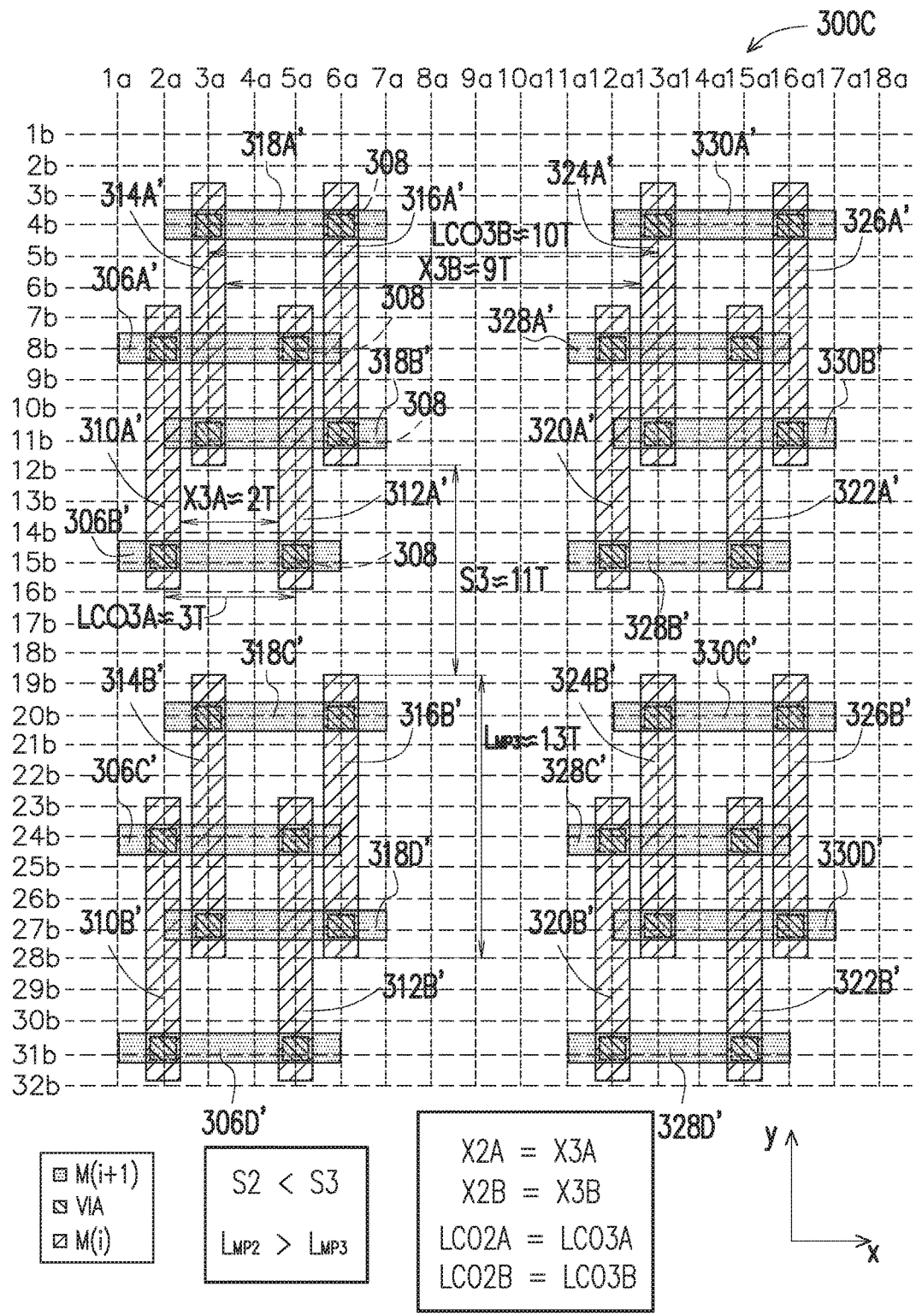
FIG. 3C is a layout diagram of another conductive line structure of an IC structure, in accordance with at least one embodiment of the present disclosure.
Figure 3C:
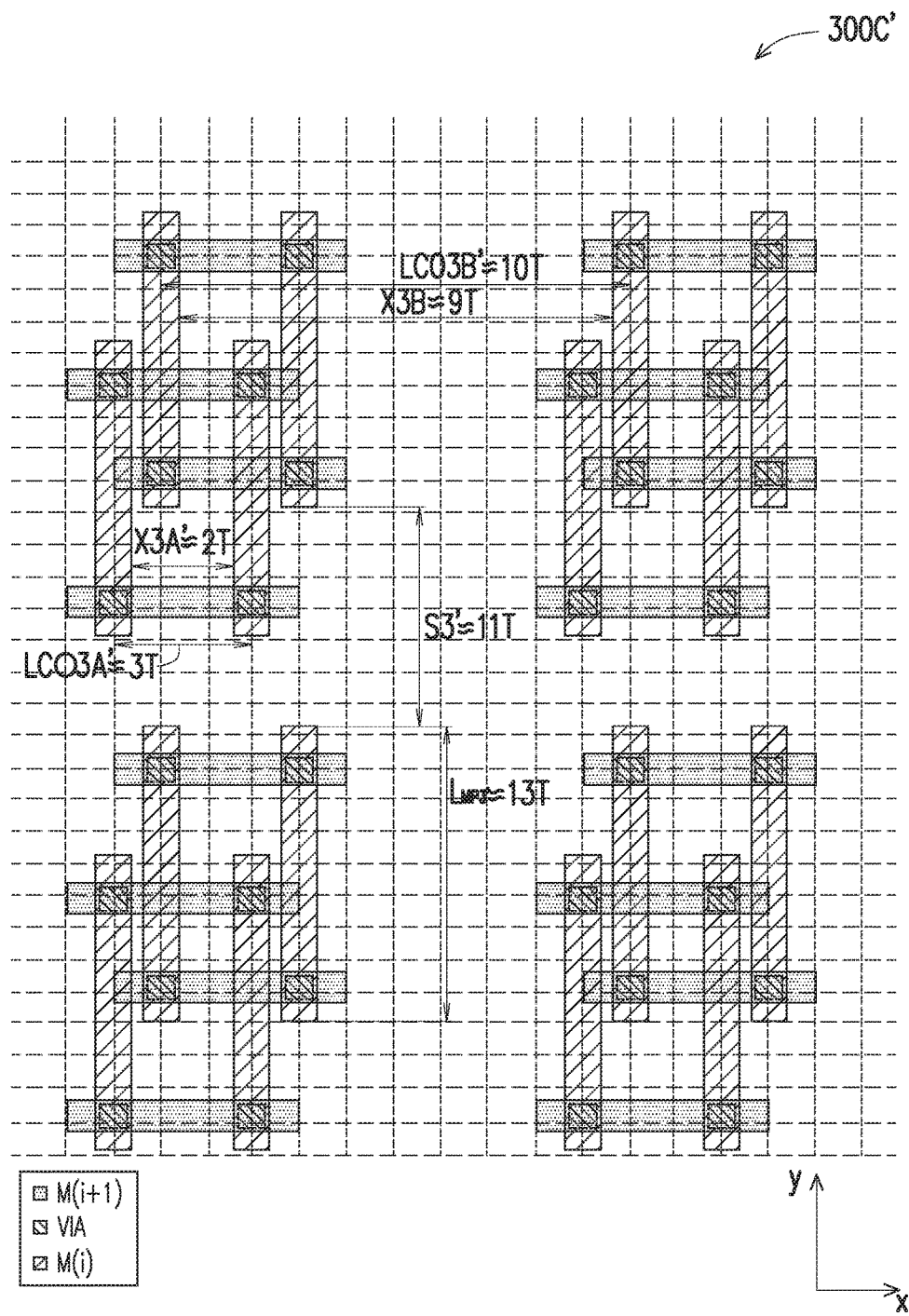
Figure 4:
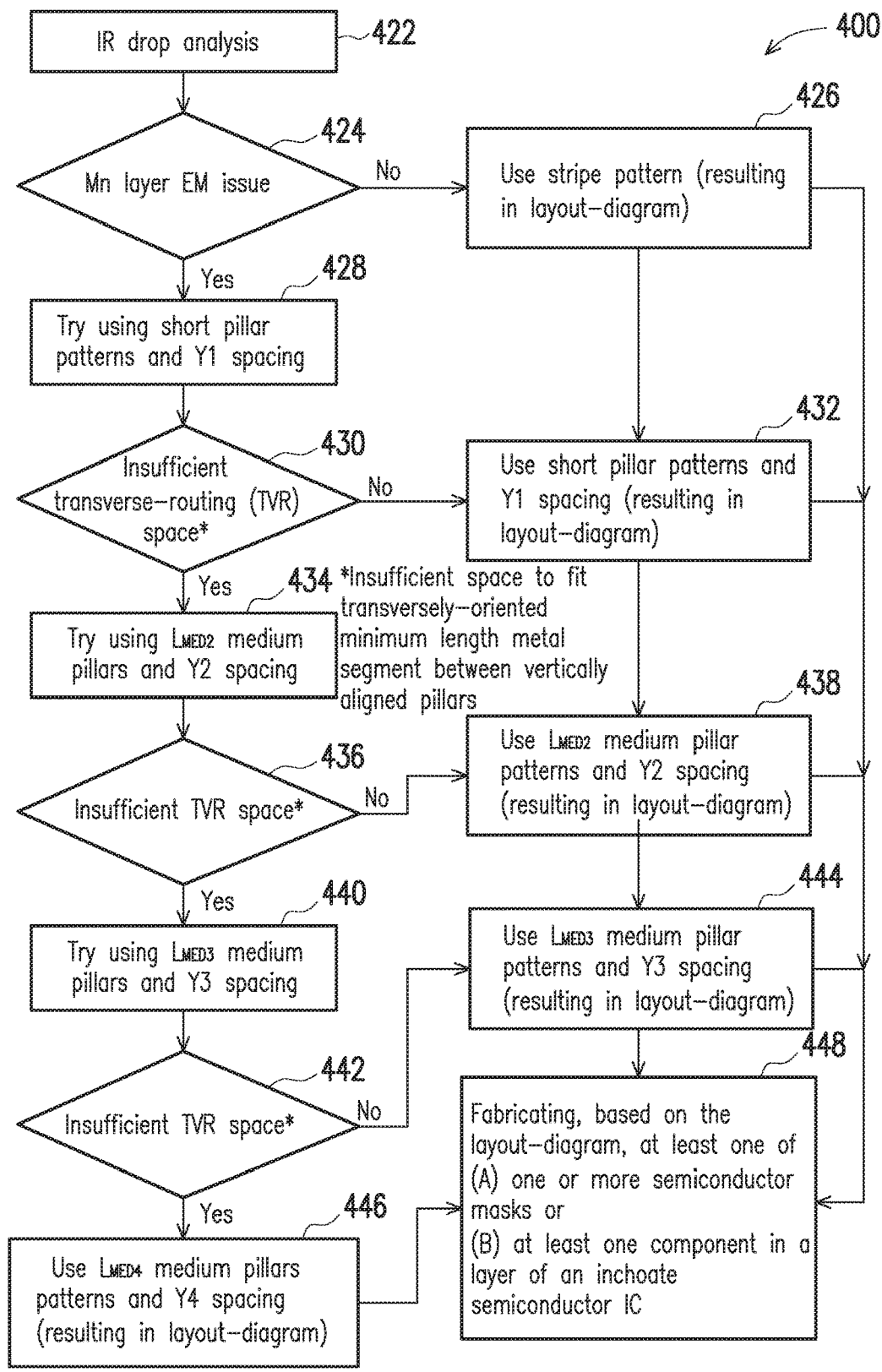
FIG. 4 is a flowchart of a method of generating a layout diagram of a conductive line structure of an IC structure, in accordance with at least one embodiment of the present disclosure.

An IC structure fabricated at least in part according layout diagram 300A of FIG. 3A (relative to a corresponding IC structure not fabricated according to layout diagram 300A), has one or more of the following advantages: merged-pillars and therefore a reduced consumption of routing-resources and/or a greater wiring density; or a reduced total wiring length (TWL) and therefore reduced Joule heating According to at least one embodiment of the present disclosure, layout diagram 300A is revised into a layout diagram 300C of FIG. 3C (discussed below, see also the discussion below of the flowchart of FIG. 4) as a way to achieve TVR vertical-separation (vertical-gap) rule compliance (relative to a transversely routed line pattern representing a conductive segment/portion in layer M(i+j), which would be M(i+j)=M(3) in the context of FIG. 3A), and thereby achieve sufficient TVR vertical-separation for transversely routing a line pattern. In some embodiments, as part of revising layout diagram 300A into layout diagram 300C, via patterns 308 are relocated accordingly.

FIG. 3B is a cross-sectional diagram of a conductive line structure 300A of an IC structure, in accordance with at least one embodiment of the present disclosure. In some embodiments, the IC structure is IC structure 100 of FIG. 1. In some embodiments, conductive line structure 300B is fabricated at least in part according to layout diagram 300A of FIG. 3A.

In FIG. 3B, conductive line structure 300B includes: medium pillars 310B″, 312B″, 314B″ and 316B″, which are conductive structures and which relate to corresponding medium pillar patterns 310B, 312B, 314B and 316B of FIG. 3A; vias 308″, which are conductive structures and which relate to via patterns 308 of FIG. 3A; and a short pillar 306C″, which is a conductive structure and which relates to short pillar pattern 306B of FIG. 3A.

FIG. 3C is a layout diagram 300C of a conductive line structure of an IC structure, in accordance with at least one embodiment of the present disclosure.

In some embodiments, the conductive line structure is conductive line structure 102 of FIG. 1. In some embodiments, the IC structure is IC structure 100 of FIG. 1. In some embodiments, the conductive line structure is conductive line structure 300B of FIG. 3B.

Layout diagram 300C of FIG. 3C is similar to layout diagram 300A of FIG. 3A. For the sake of brevity, similarities between layout diagram 300C and layout diagram 300A will not be discussed. Rather, the discussion will focus on differences between layout diagram 300C and layout diagram 300A.

In FIG. 3C, medium pillar patterns 310A'-310B', 312A'-312B', 314A'-314B', 316A'-316B', 320A'-320B', 322A'-322B', 322A'-322B', 324A'-324B', and the like, are offset from immediately neighboring ones of each other in the vertical direction by a alpha-direction-separation (vertical-separation in FIG. 3C) distance S3, where S3 is greater than the distance S2 such that S2<S3. An advantage of increasing from S2 in FIG. 3A to S3 in FIG. 3C is that S3 provides greater space between the medium pillar patterns, which facilitates placement/routing of signal lines.

While the long axes short pillar patterns 306A', 306C', 318A' and 318C' remain substantially co-track aligned with corresponding beta tracks 8b, 24b, 4b and 20b in FIG. 3C, the long axes of short pillar patterns 306B', 306D', 318B' and 318D' have been upward relative to the locations of the long axes of corresponding short pillar patterns 306B, 306D, 318B and 318D in FIG. 3A. In FIG. 3C, the long axes of short pillar patterns 306B', 306D', 318B' and 318D' are located between pairs of beta tracks 14b & 15b, 30b & 31b, 10b & 11b, and 26b & 27b.

Each of medium pillar patterns 310A'-310B', 312A'-312B', 314A'-314B', 316A'-316B', 320A'-320B', 322A'-322B', 322A'-322B', 324A'-324B', and the like, has a length, $L_{MP3}$, where $L_{MP3}<L_{MP2}$. In FIG. 3C, $L_{MP3}$ is substantially 13 tracks (13T). In some embodiments, S3 is a function of $S_{EOL}$ such that S3=f($S_{EOL}$). In some embodiments, the distance S3 is selected according to the TVR separation threshold of vertical-separation for an M(i+j) layer of metallization, which in FIG. 3C has j=2 such that M(i+j)=M(3). In some embodiments, j is a positive even integer and j≥4.

The distance S3 of vertical-separation is slightly greater than substantially S2 such that S3≈S2 AND S3>(≈S2). In FIG. 3C, S3 is substantially 11 tracks (11T). In some embodiments, (≈S2+1T)≤S3≤(≈S2+2T). In some embodiments, S3 is a function of $S_{EOL}$ such that S3=f($S_{EOL}$), where (again) $S_{EOL}$ represents a minimum end-of-line spacing of a process-node used for manufacturing the conductive line structure corresponding to layout diagram 300C. In some embodiments, ≈(7/3)*$S_{EOL}$≤S3≤≈3*$S_{EOL}$. In some embodiments, S3 satisfies a relation other than the relation (≈S2+1T)≤S3≤(≈S2+2T) or the relation ≈(4/3)*$S_{EOL}$≤S2≤≈2*$S_{EOL}$. In some embodiments, S3 is a number of tracks other than substantially 11.

In some embodiments, $L_{MP2}$<$L_{LP}$, where (again) $L_{LP}$ is a length of a long pillar, and where (again) $L_{LP}$ is substantially equal to, albeit without being greater than, the Blech length, $L_{Blech}$, such that $L_{LP}$≈$L_{Blech}$ AND $L_{LP}$≤$L_{Blech}$. It is noted that $L_{Blech}$ represents a length of conductor below which substantially no electromigration occurs.

In FIG. 3C, LCO3A is substantially three tracks (3T) such that LCO3A≈3T, which results in corresponding gaps of distance X3A, where X3A is substantially two tracks (2T) in FIG. 3C such that X3A≈2T. In some embodiments, LCO3A is a number of tracks greater than substantially three. In some embodiments, X3A is a number of tracks other than substantially two.

Also in FIG. 3C, LCO3B is substantially ten tracks (10T) such that LCO3B 10T, which results in corresponding gaps of distance X3B, where X3B is substantially nine tracks (9T) in FIG. 3C such that X3B≈9T. In some embodiments, LCO3B is a number of tracks greater than substantially ten. In some embodiments, X3B is a number of tracks other than approximately nine.

In some embodiments, layout diagram 300C is part of a power grid. In some embodiments, medium pillar patterns 310A'-310B', 312A'-312B', 320A'-320B' and 322A'-322B' represent medium pillars which are provided with a first reference voltage. In some embodiments, the first reference voltage is VDD. In some embodiments, medium pillar patterns 314A'-314B', 316A'-316B', 324A'-324B' and 326A'-326B' represent medium pillars which are provided with a second reference voltage. In some embodiments, the first reference voltage is VSS.

Figure 3D:
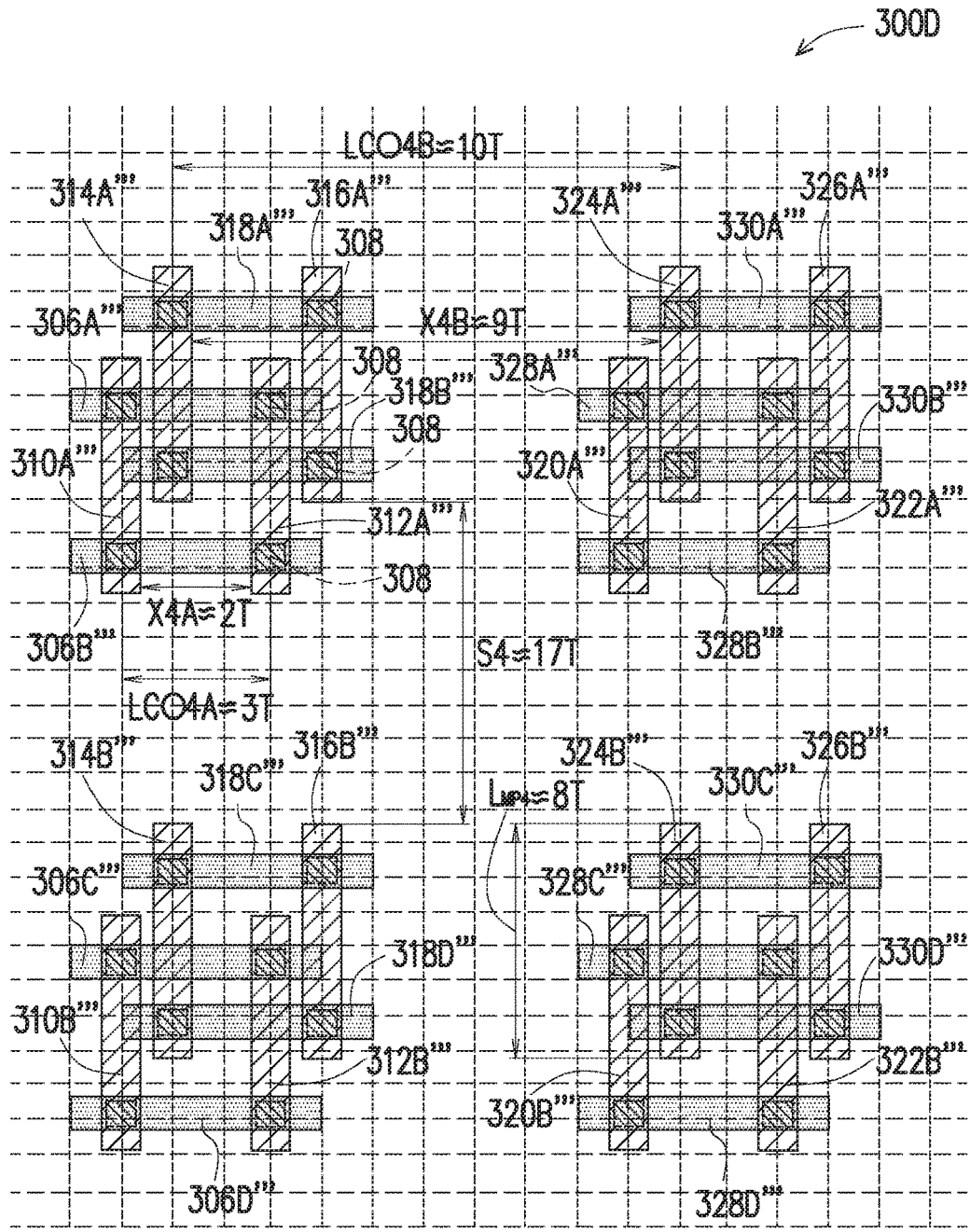
FIG. 3D is a layout diagram of another conductive line structure of an IC structure, in accordance with at least one embodiment of the present disclosure.

An IC structure fabricated at least in part according layout diagram 300C of FIG. 300C (relative to a corresponding IC structure not fabricated according to layout diagram 300C), has one or more of the following advantages: merged-pillars and therefore a reduced consumption of routing-resources and/or a greater wiring density; or a reduced total wiring length (TWL) and therefore reduced Joule heating According to at least one embodiment of the present disclosure, layout diagram 300C is revised into a layout diagram 300D of FIG. 3D (discussed below, see also the discussion below of the flowchart of FIG. 4) as a way to achieve TVR vertical-separation (vertical-gap) rule compliance (relative to a transversely routed line pattern representing a conductive segment/portion in layer M(i+j), which would be M(i+j)=M(5) in the context of FIG. 3C), and thereby achieve sufficient TVR vertical-separation for transversely routing a line pattern. In some embodiments, as part of revising layout diagram 300C into layout diagram 300D, via patterns 308 are relocated accordingly.

|[TSA1]|FIG. 3C' is a layout diagram 300C' of a conductive line structure of an IC structure, in accordance with at least one embodiment of the present disclosure.

Layout diagram 300C' of FIG. 3C' is a simplified version of layout diagram 300C of FIG. 3C. In particular, many of the labels and callouts of layout diagram 300C of FIG. 3C have been omitted from layout diagram 300C' of FIG. Layout diagram 300C' of FIG. 3C' is provided, e.g., to facilitate side-by-side comparison with a layout diagram 300D of FIG. 3D (discussed below).|[TSA2]|

FIG. 3D is a layout diagram 300D of a conductive line structure of an IC structure, in accordance with at least one embodiment of the present disclosure.

In some embodiments, the conductive line structure is conductive line structure 102 of FIG. 1. In some embodiments, the IC structure is IC structure 100 of FIG. 1. In some embodiments, the conductive line structure is conductive line structure 300B of FIG. 3B.

Layout diagram 300D of FIG. 3D is similar to layout diagram 300A of FIG. 3A. For the sake of brevity, similarities between layout diagram 300D and layout diagram 300A will not be discussed. Rather, the discussion will focus on differences between layout diagram 300D and layout diagram 300A.

In FIG. 3D, medium pillar patterns 310A'''-310B''', 312A'''-312B''', 314A'''-314B''', 316A'''-316B''', 320A'''-320B''', 322A'''-322B''', 322A'''-322B''', 324A'''-324B''', and the like, are offset from immediately neighboring ones of each other in the vertical direction by alpha-direction-separation (vertical-separation in FIG. 3D) distance S4, where S4 is greater than the distance S3 such that S3<S4. An advantage of increasing from S3 in FIGS. 3C & 3C' to S4 in FIG. 3D is that S4 provides greater space between the medium pillar patterns, which facilitates placement/routing of signal lines. Also, the long axes of short pillars 306A'''-306D''', 318A'''-318D''', 328A'''-328D''' and 330A'''-330D''' have been shifted in the vertical direction relative to the locations of the long axes of corresponding short pillar patterns 306A'-306D', 318A'-318D', 328A'-328D' and 330A'-330D' in FIG. 3C.

Each of medium pillar patterns 310A'-310B', 312A'-312B', 314A'-314B', 316A'-316B', 320A'-320B', 322A'-322B', 322A'-322B', 324A'-324B', and the like, has a length, $L_{MP4}$, where $L_{MP4}$<$L_{MP3}$. In FIG. 3D, $L_{MP4}$ is substantially eight tracks (8T). In some embodiments, S4 is a function of $S_{EOL}$ such that S4=f($S_{EOL}$). In some embodiments, the distance S4 is selected according to the TVR separation threshold of vertical-separation for an M(i+j+k) layer of metallization, where k is a positive even integer and k≥2. In FIG. 3D, k=2 and i=2 such that M(i+j+k)=M(5). In some embodiments, k is a positive even integer and k≥4.

The distance S4 of vertical-separation is greater than S3 such that S3<S4. In FIG. 3D, S4 is substantially seventeen tracks (17T). In some embodiments, (≈S3+4T)≤S4≤(≈S3+6T). In some embodiments, S4 is a function of $S_{EOL}$ such that S4=f($S_{EOL}$), where (again) $S_{EOL}$ represents a minimum end-of-line spacing of a process-node used for manufacturing the conductive line structure corresponding to layout diagram 300B. In some embodiments, ≈(13/3)*$S_{EOL}$≤S4≤≈5*$S_{EOL}$. In some embodiments, S4 satisfies a relation other than the relation (≈S3+4T)≤S4≤(≈S3+6T) or the relation ≈(13/3)*$S_{EOL}$≤S4≤≈5*$S_{EOL}$. In some embodiments, S4 is a number of tracks other than substantially 19.

In some embodiments, $L_{MP4}$<$L_{LP}$, where (again) $L_{LP}$ is a length of a long pillar, and where (again) $L_{LP}$ is substantially equal to, albeit without being greater than, the Blech length, $L_{Blech}$, such that $L_{LP}$≈$L_{Blech}$ AND $L_{LP}$≤$L_{Blech}$. It is noted that $L_{Blech}$ represents a length of conductor below which substantially no electromigration occurs.

In FIG. 3D, LCO4A is substantially three tracks (3T) such that LCO4A≈3T, which results in corresponding gaps of distance X4A, where X4A is substantially two tracks (2T) in FIG. 3C such that X4A≈2T. In some embodiments, LCO4A is a number of tracks greater than substantially three. In some embodiments, X4A is a number of tracks other than substantially two.

Also in FIG. 3D, LCO4B is substantially ten tracks (10T) such that LCO4B 10T, which results in corresponding gaps of distance X4B, where X4B is substantially nine tracks (9T) in FIG. 3D such that X4B≈9T. In some embodiments, LCO4B is a number of tracks greater than substantially ten. In some embodiments, X4B is a number of tracks greater than substantially nine.

|$_{[TS43]}$In some embodiments, layout diagram 300C is part of a power grid. In some embodiments, medium pillar patterns 310A'''-310B''', 312A'''-312B''', 320A'''-320B''' and 322A'''-322B''' represent medium pillars which are provided with a first reference voltage. In some embodiments, the first reference voltage is VDD. In some embodiments, medium pillar patterns 314A'''-314B''', 316A'''-316B''', 324A'''-324B''' and 326A'''-326B''' represent medium pillars which are provided with a second reference voltage. In some embodiments, the first reference voltage is VSS.

An IC structure fabricated at least in part according layout diagram 300D of FIG. 3D (relative to a corresponding IC structure not fabricated according to layout diagram 300D), has one or more of the following advantages: merged-pillars and therefore a reduced consumption of routing-resources and/or a greater wiring density; or a reduced total wiring length (TWL) and therefore reduced Joule heating FIG. 4 flowchart of a method 400 of generating a layout diagram of a conductive line structure of an IC structure, in accordance with at least one embodiment of the present disclosure.

In some embodiments, the layout diagram generated by method 400 is layout diagram 200B of FIG. 2B. In some embodiments, the layout diagram generated by method 400 is layout diagram 300A of FIG. 3A. In some embodiments, the layout diagram generated by method 400 is layout diagram 300C of FIG. 3C. In some embodiments, the layout diagram generated by method 400 is layout diagram 300C' of FIG. 3C'. In some embodiments, the layout diagram generated by method 400 is layout diagram 300D of FIG. 3D.

In FIG. 4, the flowchart of method 400 includes blocks 422-448. At least one of blocks 422-440 is executed by a processor of a computer. An example of the processor is a processor 502 of FIG. 5 (discussed above). An example of the computer is an electronic design automation (EDA) system 500 of FIG. 5 (discussed below). In some embodiments, each of blocks 422-446 is executed by the processor of the computer. In some embodiments, the layout diagram generated by method 400 is stored on a non-transitory computer-readable medium. An example of the non-transitory computer-readable medium is layout diagram 507 stored in memory 504 of FIG. 5 (discussed below).

At block 422, an IR drop analysis is executed for conductive segment segments in a layer $M_n$. Assuming that the conductive segments in the $M_n$ layer satisfy the IR drop analysis of block 422, the process flow then proceeds to block 424 wherein a determination is made whether there is an electromigration issue in any of one or more stripe patterns representing conductive portions/segments in the $M_n$ layer. If the result of block 424 is negative, then the process flow proceeds to block 426 in which a stripe pattern is used in the layout, resulting in the layout diagram. In some embodiments, a stripe pattern represents a conductive line which is longer than a long pillar (where a length of a long pillar is related to the Blech length, $L_{Blech}$, discussed above). From block 426, the process flow then proceeds to block 448 where, based on the layout, at least one of (A) one or more semiconductor masks is fabricated (see FIG. 12, discussed below) or (B) at least one component in a layer of an inchoate semiconductor integrated circuit is fabricated (again, see FIG. 6, discussed below).

If the result of block 424 is positive, i.e., an electromigration issue is determined in the layout, then the process flow proceeds to block 428. At block 428, an attempt is made to use short pillars and Y1 spacing between vertically-adjacent pairings of the short pillar patterns. Execution of block 428 causes the insertion of short pillars into the layout diagram in replacement of corresponding stripe pattern(s) having the electromigration issue. Examples of the short pillar patterns are short pillar patterns 202A-202D and 204A-204D of FIG. 2A (discussed above). An example of the Y1 spacing is $S_{EOL}$ in FIG. 2A. From block 428, flow proceeds to block 430.

At block 430, a determination is made whether there is insufficient space for TVR routing. More particularly, execution of block 430 determines whether the vertical-separation distance Y1 between vertically-adjacent pairings of the short pillar patterns is sufficient to comply with a TVR separation threshold of vertical-separation for a conductive segment/portion in layer M(i), where i is a non-negative integer, and thereby accommodate a line pattern (representing a conductive segment/portion in layer M(i)) routed transversely therebetween. An example showing an insufficient vertical-separation distance is shown in FIG. 2A. If the result of block 430 is negative, then the process flow proceeds to block 432 in which the short pillar patterns and Y1 spacing (see block 428) are used, resulting in the layout. From block 432, flow proceeds to block 448 (discussed above).

If the result of block 430 is positive, then flow proceeds to block 434. At block 434, an attempt is made to use medium pillars of a length $L_{MED2}$ and Y2 spacing between vertically-adjacent pairings of the medium pillar patterns. More particularly, execution of block 434 merges pairings of short pillar patterns into corresponding medium pillar patterns of length $L_{MED2}$ and sets the Y2 spacing between vertically-adjacent pairings of the medium pillar patterns having length $L_{MED2}$. A first example of such merging and spacing is shown in FIG. 2B, where pairings of short pillar patterns 202A-202D and 204A-204D of FIG. 2A have been merged into corresponding medium pillar patterns 210A-210B and 212A-212B of FIG. 2B, with Y2=S2 in FIG. 2B. A second example of such merging is shown in FIG. 3A, where pairings of short pillar patterns 202A-202D, 204A-204D, and the like of FIG. 2A have been merged into corresponding medium pillar patterns 310A-310B, 312A-312B, and the like of FIG. 3A, with Y2=S2 in FIG. 3A. From block 434, flow proceeds to block 436.

At block 436, a determination is made whether there is insufficient space for TVR routing. More particularly, execution of block 436 determines whether the vertical-separation distance Y2 between vertically-adjacent pairings of the short pillar patterns is sufficient to comply with a TVR separation threshold of vertical-separation for a conductive segment/portion in layer M(i), and thereby accommodate a line pattern (representing a conductive segment/portion in layer M(i)) routed transversely therebetween. If the result of block 436 is negative, then flow proceeds to block 438. At block 438, medium pillars of length $L_{MED2}$ and Y2 spacing are used, resulting in the revised layout diagram. From block 438, flow proceeds to block 448 (discussed above).

If the result of block 436 is positive, then flow proceeds to block 440. At block 440, an attempt is made to use medium pillars of a length $L_{MED3}$ and Y3 spacing between vertically-adjacent pairings of the medium pillar patterns. More particularly, execution of block 434 reduces the length of medium pillar patterns from the length $L_{MED2}$ to the length $L_{MED2}$, and increases the spacing between vertically-adjacent pairings of the medium pillar patterns from the distance S2 to the distance S3. An example of such length-reduction and spacing-increase is shown in FIG. 3C, where medium pillar patterns 310A-310B, 312A-312B, 314A-314B, 320A-320B, 322A-322B, 324A-324B and 326A-326B of FIG. 3A, which have length $L_{MED2}=L_{MP2}$ in FIG. 3A, have been shortened to medium pillar patterns 310A'-310B', 312A'-312B', 314A'-314B', 320A'-320B', 322A'-322B', 324A'-324B' and 326A'-326B' of FIG. 3C, which have length $L_{MED3}=L_{MP3}$ in FIG. 3C, with Y3=S3 in FIG. 3C. From block 440, flow proceeds to block 442.

At block 442, a determination is made whether there is insufficient space for TVR routing. More particularly, execution of block 442 determines whether the vertical-separation distance Y3 between vertically-adjacent pairings of the short pillar patterns is sufficient to comply with a TVR separation threshold of vertical-separation for a conductive segment/portion in layer M(i), and thereby accommodate a line pattern (representing a conductive segment/portion in layer M(i)) routed transversely therebetween. If the result of block 442 is negative, then flow proceeds to block 444. At block 444, medium pillars of length $L_{MED3}$ and Y3 spacing are used, resulting in the revised layout diagram. From block 444, flow proceeds to block 448 (discussed above).

If the result of block 442 is positive, then flow proceeds to block 446. At block 446, medium pillars of a length $L_{MED43}$ and Y4 spacing between vertically-adjacent pairings of the medium pillar patterns is used to form the revised layout diagram. More particularly, execution of block 446 reduces the length of medium pillar patterns from the length $L_{MED3}$ to the length $L_{MED4}$, and increases the spacing between vertically-adjacent pairings of the medium pillar patterns from the distance S3 to the distance S4. An example of such length-reduction and spacing-increase is shown in FIG. 3D, where medium pillar patterns 310A'-310B', 312A'-312B', 314A'-314B', 320A'-320B', 322A'-322B', 324A'-324B' and 326A'-326B' of FIG. 3C, which have length $L_{MED3}=L_{MP3}$ in FIG. 3C, have been shortened to medium pillar patterns 310A'''-310B''', 312A'''-312B''', 314A'''-314B''', 320A'''-320B''', 322A'''-322B''', 324A'''-324B''' and 326A'''-326B''' of FIG. 3C, which have length $L_{MED4}=L_{MP4}$ in FIG. 3D, with Y4=S4 in FIG. 3D. From block 440, flow proceeds to block 448 (discussed above).

Figure 5:
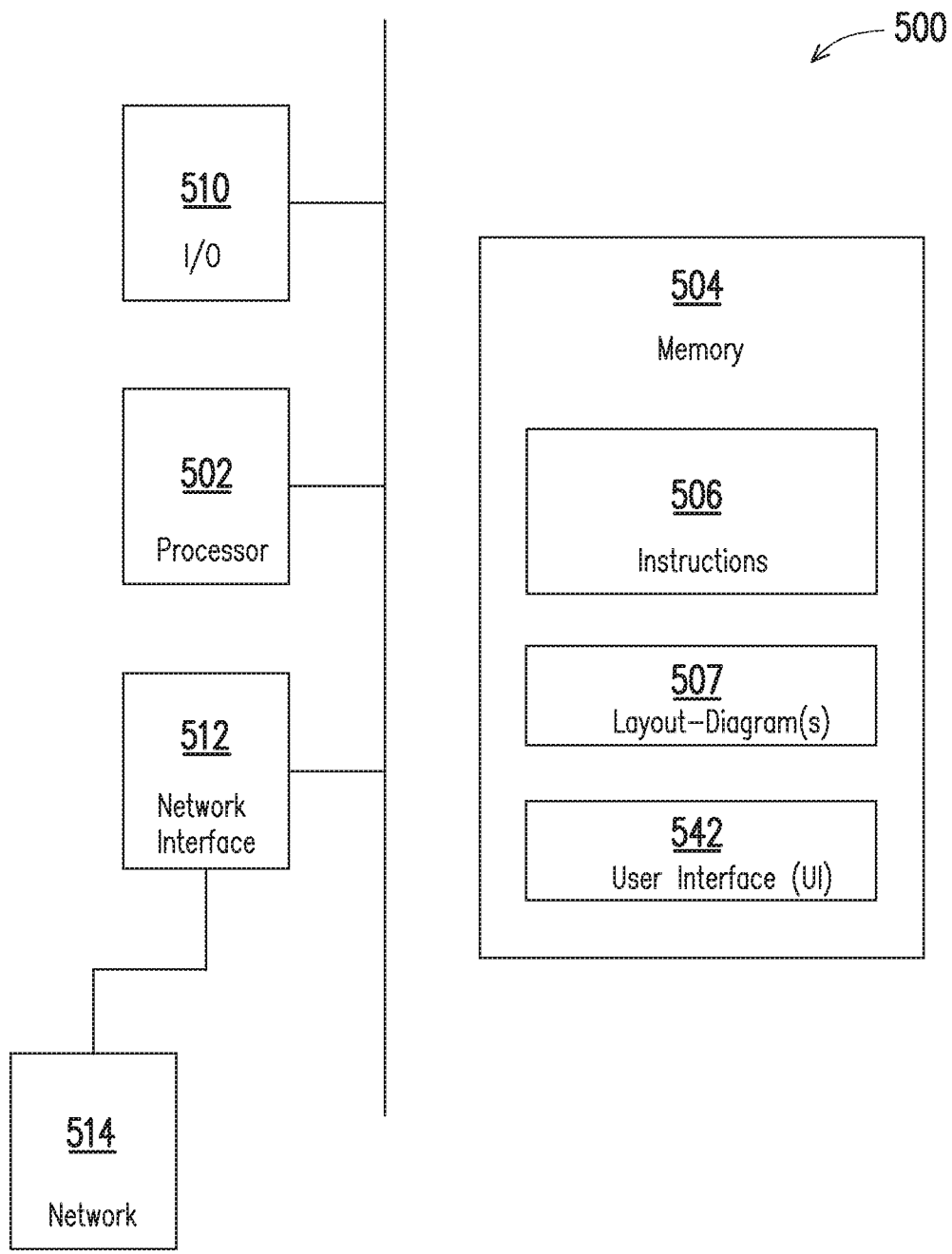
FIG. 5 is a block diagram of an electronic design automation (EDA) system, in accordance with at least one embodiment of the present disclosure.

FIG. 5 is a block diagram of an electronic design automation (EDA) system 500, in accordance with at least one embodiment of the present disclosure.

In some embodiments, EDA system 500 includes an automatic placement and routing (APR) system. The method of the flowchart of FIG. 4 is implemented, for example, using EDA system 500, in accordance with some embodiments.

In some embodiments, EDA system 500 is a general purpose computing device including a hardware processor 502 and a non-transitory, computer-readable storage medium 504. Storage medium 504, amongst other things, is encoded with, i.e., stores, computer program code 506, i.e., a set of executable instructions. Execution of instructions 506 by hardware processor 502 represents (at least in part) an EDA tool which implements a portion or all of, e.g., the method of FIG. 4, in accordance with one or more embodiments (hereinafter, the noted process and/or method).

Processor 502 is electrically coupled to computer-readable storage medium 504 via a bus 508. Processor 502 is also electrically coupled to an I/O interface 510 by bus 508. A network interface 512 is also electrically connected to processor 502 via bus 508. Network interface 512 is connected to a network 514, so that processor 502 and computer-readable storage medium 504 are capable of connecting to external elements via network 514. Processor 502 is configured to execute computer program code 506 encoded in computer-readable storage medium 504 in order to cause system 500 to be usable for performing a portion or all of the noted process and/or method. Computer-readable storage medium 504 also includes one or more layout diagrams 507 generated according to a portion or all of the noted process and/or method. In one or more embodiments, processor 502 is a central processing unit (CPU), a multi-processor, a distributed processing system, an application specific integrated circuit (ASIC), and/or a suitable processing unit.

In one or more embodiments, computer-readable storage medium 504 is an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 504 includes a compact disk-read only memory (CD-ROM), a compact disk-read/write (CD-R/W), and/or a digital video disc (DVD).

In one or more embodiments, storage medium 504 stores computer program code 506 configured to cause system 500 (where such execution represents (at least in part) the EDA tool) to be usable for performing a portion or all of the noted process and/or method. In one or more embodiments, storage medium 504 also stores information which facilitates performing a portion or all of the noted process and/or method. In one or more embodiments, storage medium 504 stores a library (not shown) of standard cells.

EDA system 500 includes I/O interface 510. I/O interface 510 is coupled to external circuitry. In one or more embodiments, I/O interface 510 includes a keyboard, keypad, mouse, trackball, trackpad, touchscreen, and/or cursor direction keys for communicating information and commands to processor 502.

Again, EDA system 500 includes network interface 512. Network interface 512 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted process and/or method, is implemented in two or more systems 500.

System 500 is configured to receive information through I/O interface 510. The information received through I/O interface 510 includes one or more of instructions, data, design rules, libraries of standard cells, and/or other parameters for processing by processor 502. The information is transferred to processor 502 via bus 508. EDA system 500 is configured to receive information related to a UI through I/O interface 510. The information is stored in computer-readable medium 504 as user interface (UI) 542.

In some embodiments, a portion or all of the noted process and/or method is implemented as a standalone software application for execution by a processor. In some embodiments, a portion or all of the noted process and/or method is implemented as a software application that is a part of an additional software application. In some embodiments, a portion or all of the noted process and/or method is implemented as a plug-in to a software application. In some embodiments, at least one of the noted process and/or method is implemented as a software application that is a portion of an EDA tool. In some embodiments, a portion or all of the noted process and/or method is implemented as a software application that is used by EDA system 500. In some embodiments, a layout diagram is generated using a tool such as VIRTUOSO® available from CADENCE DESIGN SYSTEMS, Inc., or another suitable layout diagram generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 6:
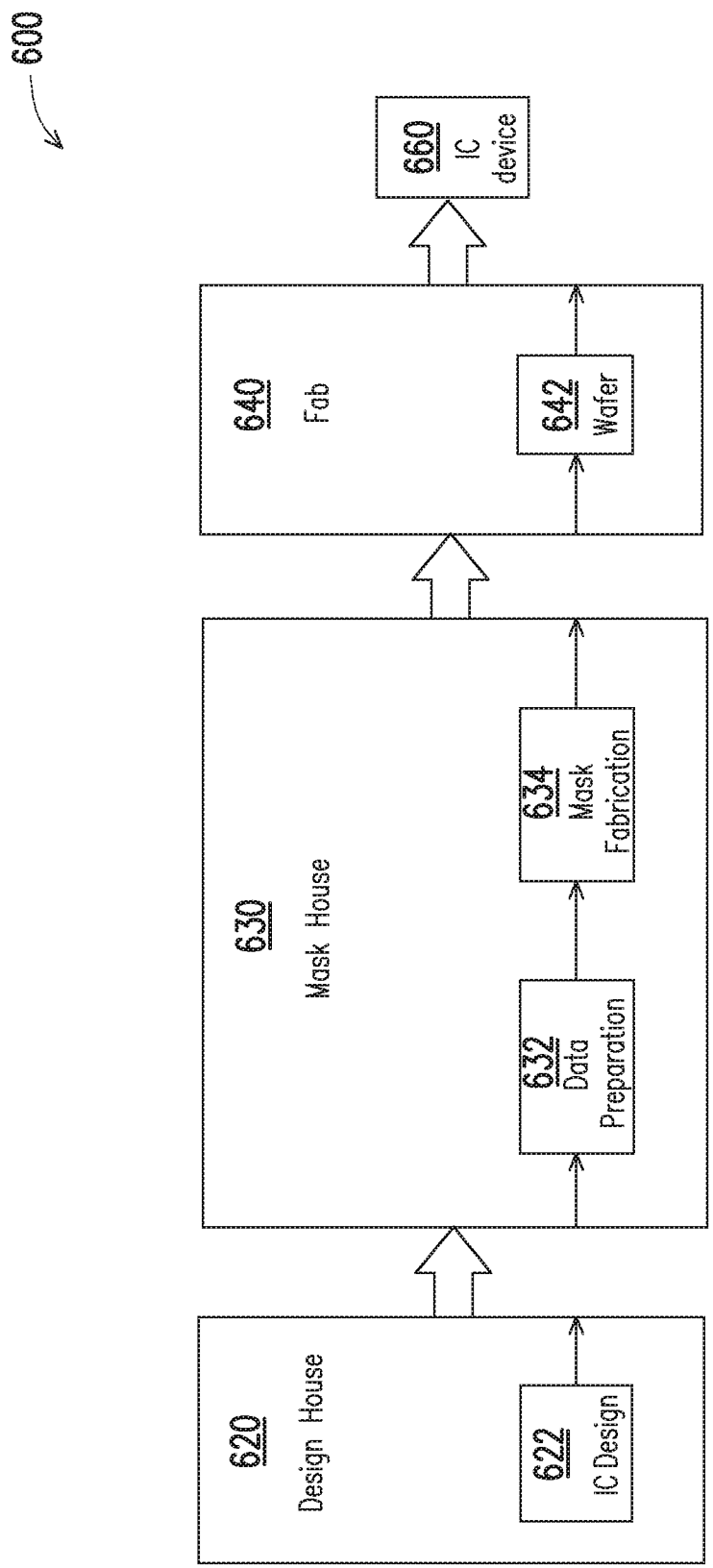
FIG. 6 is a block diagram of an integrated circuit (IC) manufacturing system, and an IC manufacturing flow associated therewith, in accordance with at least one embodiment of the present disclosure.

FIG. 6 is a block diagram of an integrated circuit (IC) manufacturing system 600, and an IC manufacturing flow associated therewith, in accordance with at least one embodiment of the present disclosure.

In FIG. 6, IC manufacturing system 600 includes entities, such as a design house 620, a mask house 630, and an IC manufacturer/fabricator ("fab") 650, that interact with one another in the design, development, and manufacturing cycles and/or services related to manufacturing an IC device 660. The entities in system 600 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 620, mask house 630, and IC fab 650 is owned by a single larger company. In some embodiments, two or more of design house 620, mask house 630, and IC fab 650 coexist in a common facility and use common resources.

Design house (or design team) 620 generates an IC design layout diagram 622. IC design layout diagram 622 includes various geometrical patterns designed for an IC device 660. The geometrical patterns correspond to patterns of metal, oxide, or semiconductor layers that make up the various components of IC device 660 to be fabricated. The various layers combine to form various IC features. For example, a portion of IC design layout diagram 622 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 620 implements a proper design procedure to form IC design layout diagram 622. The design procedure includes one or more of logic design, physical design or place and route. IC design layout diagram 622 is presented in one or more data files having information of the geometrical patterns. For example, IC design layout diagram 622 can be expressed in a GDSII file format or DFII file format.

Mask house 630 includes data preparation 632 and mask fabrication 644. Mask house 630 uses IC design layout diagram 622 to manufacture one or more masks to be used for fabricating the various layers of IC device 660 according to IC design layout diagram 622. Mask house 630 performs mask data preparation 632, where IC design layout diagram 622 is translated into a representative data file ("RDF"). Mask data preparation 632 provides the RDF to mask fabrication 644. Mask fabrication 644 includes a mask writer. A mask writer converts the RDF to an image on a substrate, such as a mask (reticle) or a semiconductor wafer. The design layout diagram is manipulated by mask data preparation 632 to comply with particular characteristics of the mask writer and/or requirements of IC fab 650. In FIG. 6, mask data preparation 632 and mask fabrication 644 are illustrated as separate elements. In some embodiments, mask data preparation 632 and mask fabrication 644 can be collectively referred to as mask data preparation.

In some embodiments, mask data preparation 632 includes optical proximity correction (OPC) which uses lithography enhancement techniques to compensate for image errors, such as those that can arise from diffraction, interference, other process effects and the like. OPC adjusts IC design layout diagram 622. In some embodiments, mask data preparation 632 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 632 includes a mask rule checker (MRC) that checks the IC design layout diagram that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram to compensate for limitations during mask fabrication 644, which may undo part of the modifications performed by OPC in order to meet mask creation rules.

In some embodiments, mask data preparation 632 includes lithography process checking (LPC) that simulates processing that will be implemented by IC fab 650 to fabricate IC device 660. LPC simulates this processing based on IC design layout diagram 622 to create a simulated manufactured device, such as IC device 660. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 622.

It should be understood that the above description of mask data preparation 632 has been simplified for the purposes of clarity. In some embodiments, data preparation 632 includes additional features such as a logic operation (LOP) to modify the IC design layout diagram according to manufacturing rules. Additionally, the processes applied to IC design layout diagram 622 during data preparation 632 may be executed in a variety of different orders.

After mask data preparation 632 and during mask fabrication 644, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 644 is used in a variety of processes. For example, such a mask(s) is used in an ion implantation process to form various doped regions in the semiconductor wafer, in an etching process to form various etching regions in the semiconductor wafer, and/or in other suitable processes.

IC fab 650 is an IC fabrication business that includes one or more manufacturing facilities for the fabrication of a variety of different IC products. In some embodiments, IC Fab 650 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 650 uses the mask (or masks) fabricated by mask house 630 to fabricate IC device 660. Thus, IC fab 650 at least indirectly uses IC design layout diagram 622 to fabricate IC device 660. In some embodiments, a semiconductor wafer 652 is fabricated by IC fab 650 using the mask (or masks) to form IC device 660. Semiconductor wafer 65 includes a silicon substrate or other proper substrate having material layers formed thereon. Semiconductor wafer further includes one or more of various doped regions, dielectric features, multilevel interconnects, and the like (formed at subsequent manufacturing steps).

Details regarding an integrated circuit (IC) manufacturing system (e.g., system 600 of FIG. 6), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

An aspect of the present disclosure is directed to a method of generating a revised layout diagram of a conductive line structure for an integrated circuit (IC), the method including: for a first set of short pillar patterns, which is included in an initial layout diagram that is stored on a non-transitory computer-readable medium, which represents portions of an M(i) layer of metallization and where i is a non-negative integer, and which includes first to fourth short pillar patterns that are non-overlapping of each other, long axes of symmetry of the first to fourth short pillar patterns being substantially collinear with a reference line, determining a first distance of separation as between corresponding immediately adjacent members of the first set; recognizing that the first distance is less than a transverse routing (TVR) separation threshold for the M(i) layer; merging pairings of the first & second and third & fourth short pillar patterns into corresponding first and second medium pillar patterns which are non-overlapping of each other, which have long axes of symmetry that are substantially collinear with the first reference line; and which have a second distance of separation; and setting the second distance to be greater than the TVR separation threshold of the M(i) layer, resulting in the revised layout diagram, wherein at least one of the determining, merging and setting is executed by a processor of a computer. In some embodiments, the method further includes: fabricating, based on the layout diagram, at least one of (A) one or more semiconductor masks or (B) at least one component in a layer of an inchoate semiconductor integrated circuit. In some embodiments, the first distance is represented by a variable S1; the second distance is represented by a variable S2; the first distance S1 is equal to a minimum end-of-line spacing, $S_{EOL}$, of a process-node used for manufacturing the conductive line structure corresponding to the layout diagram; the second distance S2 has a range such that $\approx(4/3)*S_{EOL} \leq S2 \leq \approx 2*S_{EOL}$. In some embodiments, the method further includes: recognizing that the second distance is less than a TVR separation threshold for an M(i+j) layer of metallization, where j is an integer and j≥2; increasing the second distance so as to become a third distance; and setting the third distance to be greater than the TVR distance of the M(i+j) layer. In some embodiments, the first distance is represented by a variable S1; the third distance is represented by a variable S3; the first distance S1 equal to a minimum end-of-line spacing, $S_{EOL}$, of a process-node used for manufacturing the conductive line structure corresponding to the layout diagram; the third distance S3 has a range such that $\approx(7/3)*S_{EOL} \leq S2 \leq \approx 3*S_{EOL}$. In some embodiments, the method further includes: recognizing that the third distance is less than a TVR separation threshold for an M(i+j+k) layer of metallization, where k is an integer and k≥2; and increasing the third distance so as to become a fourth distance; and setting the fourth distance to be greater than the TVR distance of the M(i+j+k) layer. In some embodiments, the fourth distance is represented by a variable S4; and the fourth distance has a range such that $\approx(13/3)*S_{EOL} \leq S2 \leq \approx 5*S_{EOL}$. In some embodiments, the method further includes: setting the first and second medium pillar patterns to be a first length along the reference line; recognizing that the second distance is less than a TVR separation threshold for an M(i+j) layer of metallization, where j is an integer and j≥2; and decreasing the first length so as to become a second length; the second length being smaller than the first length. In some embodiments, a length in the alpha direction of each of the first to fourth short pillar patterns is a third length; and the third length is smaller than the second length.

Another aspect of the present disclosure is directed to a system for revising a layout diagram of a conductive line structure for an integrated circuit (IC), the system including: at least one processor; and at least one non-transitory computer-readable medium (NTCRM) including computer program code for one or more programs. The at least one NTCRM, the computer program code and the at least one processor are configured to cause the system to: for a first set of short pillar patterns which is included in an initial layout diagram that is stored in the at least one NTCRM, which represents portions of an M(i) layer of metallization and where i is a non-negative integer, and which includes first to fourth short pillar patterns that are non-overlapping of each other and have long axes of symmetry that are substantially collinear with a first reference line, determine a first distance of separation as between corresponding immediately adjacent members of the first set; recognize that the first distance is less than a transverse routing (TVR) separation threshold for the M(i) layer; and merge pairings of the first & second and third & fourth short pillar patterns into corresponding first and second medium pillar patterns which are non-overlapping of each other, which have long axes of symmetry that are substantially collinear with the first reference line, and which have a second distance of separation, the second distance being greater than the first distance; recognize that the second distance is less than a TVR separation threshold for an M(i+j) layer of metallization, where j is an integer and j≥2; and increase the second distance to a third distance, the third distance being equal to or greater than the TVR separation threshold for the M(i+j) layer, resulting in a revised layout diagram. In some embodiments, the system further includes: a facility to fabricate, based on the revised layout diagram, at least one of (A) one or more semiconductor masks or (B) at least one component in a layer of an inchoate semiconductor integrated circuit. In some embodiments, the at least one NTCRM, the computer program code and the at least one processor are further configured to cause the system to: recognize that the third distance is less than a TVR separation threshold for an M(i+j+k) layer of metallization, where k is an integer and k≥2; increase the third distance so as to become a fourth distance; and set the fourth distance to be greater than the TVR distance of the M(i+j+k) layer. In some embodiments, the system further includes: setting the first to fourth medium pillar patterns to be a first length in the alpha direction; determining that at least one of pairings of the first & second and third & fourth medium pillar patterns violates a TVR distance of alpha-direction-separation for an M(i+j) layer of metallization, where j is an integer and j≥2; and decreasing a length in the alpha direction of each of the first to fourth medium pillar patterns from the first length to a second length; the second length being smaller than the first length. In some embodiments, a length in the alpha direction of each of the first to fourth short pillar patterns is a third length; and the third length is smaller than the second length. In some embodiments, the initial layout diagram further includes: a second set of fifth to eighth short pillar patterns, the fifth to eighth short pillar patterns representing portions of an M(i+1) layer of metallization, being non-overlapping of each other, and having long axes of symmetry that are substantially parallel to a second reference line, the second reference line being substantially perpendicular to the first reference line, and being correspondingly overlapping of the first and second short pillar patterns; and via patterns which represent via structures that electrically connect ones of the short pillar patterns in the first set with corresponding ones of the short pillar patterns in the second set; and wherein the at least one NTCRM, the computer program code and the at least one processor are further configured to cause the system to relocate the via patterns to electrically connect the first and second medium pillar patterns with corresponding ones of the fifth to eighth short pillar patterns in the second set.

Yet another aspect of the present disclosure is directed to a conductive line structure in an integrated circuit (IC) and arranged relative to a grid which has alpha and beta tracks which are substantially parallel to a corresponding orthogonal alpha and beta directions, the conductive line structure including: a first set of medium pillars having long axes substantially coaxial with corresponding ones of the alpha tracks; a second set of short pillars having long axes substantially parallel with corresponding ones of the beta tracks; and vias which electrically connect the first set of medium pillars with corresponding members of the second set of short pillars. In some embodiments, the first set of medium pillars: represents portions of an M(i) layer of metallization, where i is a non-negative integer, and includes pairings of first & second and third & fourth medium pillars which are non-overlapping of each other relative to the alpha direction, and have a first distance of alpha-direction-separation therebetween. In some embodiments, the second set of short pillars: represents portions of an M(i+1) layer of metallization; are non-overlapping of each other; and have long axes of symmetry which are substantially co-track aligned with the first to fourth ones of the beta tracks; and are overlapping of the corresponding pairings of first & second and third & fourth medium pillars; and the first distance is greater than a minimum transverse-routing (TVR) separation threshold for the M(i) layer. In some embodiments, the first distance is represented by a variable S2; a process-node by which the conductive line structure was manufactured has a minimum end-of-line spacing, $S_{EOL}$; and the first distance S2 has a range such that $\approx(4/3)*S_{EOL} \leq S2 \leq \approx 2*S_{EOL}$. In some embodiments, a process-node by which the conductive line structure was manufactured has a minimum length $L_{MIN}$ of a conductive line segment; end-of-line spacing, $S_{EOL}$; and each of the first to fourth medium pillars has a length $L_{MED}$; and $L_{MED} \approx 2*L_{MIN}$. In some embodiments, the first distance is greater than a minimum TVR separation threshold for an M(i+j) layer of metallization, where j is an integer and j≥2. In some embodiments, the first distance is greater than a minimum TVR separation threshold for an M(i+j+k) layer of metallization, where k is an integer and j≥2.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating a revised layout diagram of a conductive line structure for an integrated circuit (IC), the method comprising:
   for a first set of short pillar patterns, which is included in an initial layout diagram that is stored on a non-transitory computer-readable medium, which represents portions of an M(i) layer of metallization and where i is a non-negative integer, and which includes first to fourth short pillar patterns that are non-overlapping of each other, long axes of symmetry of the first to fourth short pillar patterns being substantially collinear with a reference line,
      determining a first distance of separation as between corresponding immediately adjacent members of the first set;
   recognizing that the first distance is less than a transverse routing (TVR) separation threshold for the M(i) layer;
   merging pairings of the first & second and third & fourth short pillar patterns into corresponding first and second medium pillar patterns which are non-overlapping of each other, which have long axes of symmetry that are substantially collinear with the reference line, and which have a second distance of separation; and setting the second distance to be greater than the TVR separation threshold of the M(i) layer, resulting in the revised layout diagram; and wherein at least one of the determining, merging and setting is executed by a processor of a computer.

2. The method of claim 1, further comprising:

fabricating, based on the revised layout diagram, at least one of (A) one or more semiconductor masks or (B) at least one component in a layer of an inchoate semiconductor integrated circuit.

3. The method of claim 1, wherein:

the first distance is represented by a variable S1;

the second distance is represented by a variable S2;

the first distance S1 is equal to a minimum end-of-line spacing, $S_{EOL}$, of a process-node used for manufacturing the conductive line structure corresponding to the revised layout diagram; and the second distance S2 has a range such that $$\approx(4/3)*S_{EOL} \leq S2 \leq \approx 2*S_{EOL}.$$

4. The method of claim 1, the method further comprising:

recognizing that the second distance is less than a TVR separation threshold for an M(i+j) layer of metallization, where j is an integer and j≥2;

increasing the second distance so as to become a third distance; and setting the third distance to be greater than the TVR separation threshold of the M(i+j) layer.

5. The method of claim 4, wherein:

the first distance is represented by a variable S1;

the third distance is represented by a variable S3;

the first distance S1 equal to a minimum end-of-line spacing, $S_{EOL}$, of a process-node used for manufacturing the conductive line structure corresponding to the revised layout diagram; and the third distance S3 has a range such that $$\approx(7/3)*S_{EOL} \leq S2 \leq \approx 3*S_{EOL}.$$

6. The method of claim 4, further comprising:

recognizing that the third distance is less than a TVR separation threshold for an M(i+j+k) layer of metallization, where k is an integer and k≥2; and increasing the third distance so as to become a fourth distance; and setting the fourth distance to be greater than the TVR separation threshold of the M(i+j+k) layer.

7. The method of claim 6, wherein:

the fourth distance is represented by a variable S4; and the fourth distance has a range such that $$\approx(13/3)*S_{EOL} \leq S2 \leq \approx 5*S_{EOL}.$$

8. The method of claim 1, the method further comprising:

setting the first and second medium pillar patterns to be a first length along the reference line;

recognizing that the second distance is less than a TVR separation threshold for an M(i+j) layer of metallization, where j is an integer and j≥2; and decreasing the first length so as to become a second length; and wherein the second length is smaller than the first length.

9. The method of claim 8, wherein:

a length along the reference line of each of the first to fourth short pillar patterns is a third length; and the third length is smaller than the second length.

10. A system for revising a layout diagram of a conductive line structure for an integrated circuit (IC), the system comprising:

at least one processor; and at least one non-transitory computer-readable medium (NTCRM) including computer program code for one or more programs;

wherein the at least one NTCRM, the computer program code and the at least one processor are configured to cause the system to:

for a first set of short pillar patterns which is included in an initial layout diagram that is stored in the at least one NTCRM, which represents portions of an M(i) layer of metallization and where i is a non-negative integer, and which includes first to fourth short pillar patterns that are non-overlapping of each other and have long axes of symmetry that are substantially collinear with a first reference line, determine a first distance of separation as between corresponding immediately adjacent members of the first set;

recognize that the first distance is less than a transverse routing (TVR) separation threshold for the M(i) layer; and merge pairings of the first & second and third & fourth short pillar patterns into corresponding first and second medium pillar patterns which are non-overlapping of each other, which have long axes of symmetry that are substantially collinear with the first reference line, and which have a second distance of separation, the second distance being greater than the first distance;

recognize that the second distance is less than a TVR separation threshold for an M(i+j) layer of metallization, where j is an integer and j≥2; and increase the second distance to a third distance, the third distance being equal to or greater than the TVR separation threshold for the M(i+j) layer, resulting in a revised layout diagram.

11. The system of claim 10, further comprising:

a facility to fabricate, based on the revised layout diagram, at least one of (A) one or more semiconductor masks or (B) at least one component in a layer of an inchoate semiconductor integrated circuit.

12. The system of claim 10, wherein the at least one NTCRM, the computer program code and the at least one processor are further configured to cause the system to:

recognize that the third distance is less than a TVR separation threshold for an M(i+j+k) layer of metallization, where k is an integer and k≥2;

increase the third distance so as to become a fourth distance; and set the fourth distance to be greater than the TVR separation threshold of the M(i+j+k) layer.

13. The system of claim 10, the wherein at least one NTCRM, the computer program code and the at least one processor are further configured to cause the system to:

set the first and second medium pillar patterns to be a first length along the first reference line;

recognize that the third distance is less than a TVR separation threshold for an M(i+j) layer of metallization, where j is an integer and j≥2; and decrease the first length so as to become a second length; and wherein the second length is smaller than the first length.

14. The system of claim 13, wherein:

a length along the first reference line of each of the first to fourth short pillar patterns is a third length; and the third length is smaller than the second length.

15. The system of claim 10, wherein:
the initial layout diagram further includes:
- a second set of fifth to eighth short pillar patterns, the fifth to eighth short pillar patterns:
  - representing portions of an M(i+1) layer of metallization;
  - being non-overlapping of each other; and
  - having long axes of symmetry that are substantially parallel to a second reference line, the second reference line being substantially perpendicular to the first reference line; and
  - being correspondingly overlapping of the first and second short pillar patterns; and
- via patterns which represent via structures that electrically connect ones of the short pillar patterns in the first set with corresponding ones of the short pillar patterns in the second set; and the at least one NTCRM, the computer program code and the at least one processor are further configured to cause the system to:
- relocate the via patterns to electrically connect the first and second medium pillar patterns with corresponding ones of the fifth to eighth short pillar patterns in the second set.

16. A conductive line structure in an integrated circuit (IC) and arranged relative to a grid which has alpha and beta tracks which are substantially parallel to corresponding orthogonal alpha and beta directions, the conductive line structure comprising:
- a first set of medium pillars having long axes substantially coaxial with corresponding ones of the alpha tracks;
- a second set of short pillars having long axes substantially parallel with corresponding ones of the beta tracks; and
- vias which electrically connect the first set of medium pillars with corresponding members of the second set of short pillars;

wherein:
- the first set of medium pillars:
  - represents portions of an M(i) layer of metallization, where i is a non-negative integer, and
  - includes pairings of first & second and third & fourth medium pillars which are non-overlapping of each other relative to an alpha direction, and have a first distance of alpha-direction-separation therebetween; and
- the second set of short pillars:
  - represents portions of an M(i+1) layer of metallization;
  - are non-overlapping of each other; and
  - have long axes of symmetry which are substantially co-track aligned with first to fourth ones of the beta tracks; and
  - are overlapping of the corresponding pairings of first & second and third & fourth medium pillars; and
- the first distance is greater than a minimum transverse-routing (TVR) separation threshold for the M(i) layer.

17. The conductive line structure of claim 16, wherein:
the first distance is represented by a variable S2;
a process-node by which the conductive line structure was manufactured has a minimum end-of-line spacing, $S_{EOL}$; and
the first distance S2 has a range such that $$\approx(4/3)*S_{EOL} \leq S2 \leq \approx 2*S_{EOL}.$$

18. The conductive line structure of claim 17, wherein:
a process-node by which the conductive line structure was manufactured has a minimum length $L_{MIN}$ of a conductive line segment;
end-of-line spacing, $S_{EOL}$; and
each of the first to fourth medium pillars has a length $L_{MED}$; and $$L_{MED} \approx 2*L_{MIN}.$$

19. The conductive line structure of claim 17, wherein:
the first distance is greater than a minimum TVR separation threshold for an M(i+j) layer of metallization, where j is an integer and j≥2.

20. The conductive line structure of claim 19, wherein:
the first distance is greater than a minimum TVR separation threshold for an M(i+j+k) layer of metallization, where k is an integer and j≥2.

* * * * *